United States Patent
Lu et al.

(10) Patent No.: US 9,930,704 B2
(45) Date of Patent: Mar. 27, 2018

(54) HETEROGENEOUS DEPLOYMENT OF ACCESS POINT CLUSTERS

(71) Applicant: Aruba Networks, Inc., Sunnyvale, CA (US)

(72) Inventors: Hao Lu, Santa Clara, CA (US); Yan Liu, Santa Clara, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 251 days.

(21) Appl. No.: 14/808,532

(22) Filed: Jul. 24, 2015

(65) Prior Publication Data

US 2017/0027004 A1    Jan. 26, 2017

(51) Int. Cl.
*H04W 76/02*    (2009.01)
*H04W 12/06*    (2009.01)
(Continued)

(52) U.S. Cl.
CPC ......... *H04W 76/02* (2013.01); *H04L 12/4641* (2013.01); *H04L 63/08* (2013.01);
(Continued)

(58) Field of Classification Search
CPC ..... H04W 76/02; H04W 12/06; H04W 88/08; H04L 12/4641; H04L 63/08
See application file for complete search history.

(56) References Cited

U.S. PATENT DOCUMENTS 6,831,904 B1   12/2004   Yamao et al.
8,077,663 B2   12/2011   Mighani et al.
(Continued)

FOREIGN PATENT DOCUMENTS

EP         2624619 A1    8/2013
WO    2006/136422 A1    12/2006
(Continued)

OTHER PUBLICATIONS

Banerjee et al., IEEE Infocom 2001 Proceedings, pp. 1028-1037, DOI 10.1109/INFCOM.2001.916296.

*Primary Examiner* — Michael Thier
*Assistant Examiner* — Kent Krueger
(74) *Attorney, Agent, or Firm* — Hewlett Packard Enterprise Patent Department

(57) ABSTRACT

Described herein are systems, devices, techniques and products for configuration of access points in access point clustering environments. For example, access points are provided that self-discover existing access point clusters present on a single layer 2 broadcast domain or virtual local area network (VLAN). The access points may join one of the existing access point clusters or establish a new access point cluster, depending on compatibility or capacity, for example. Access point clusters that are present on a single VLAN may be distinguished based on a cluster identifier in order for multiple access point clusters to operate on the VLAN without creating a conflict. One or more criteria, such as a cluster identifier, a cluster size, a cluster version, a network latency, etc., may be used by an access point in determination of which of multiple access point clusters to join. When multiple clusters are operating on the VLAN, a supercluster may be formed. In such a supercluster, for example, one cluster may be elected as the master cluster for cluster management purposes.

21 Claims, 18 Drawing Sheets

(51) Int. Cl.
    *H04L 29/06*         (2006.01)
    *H04L 12/46*         (2006.01)
    *H04W 88/08*      (2009.01)
    *H04W 48/08*      (2009.01)

(52) U.S. Cl.
    CPC ............ *H04W 12/06* (2013.01); *H04W 48/08* (2013.01); *H04W 88/08* (2013.01)

(56) References Cited

U.S. PATENT DOCUMENTS

| | | |
|---|---|---|
| 8,855,553 B2 | 10/2014 | Duerksen |
| 8,942,956 B1 | 1/2015 | Perry et al. |
| 2002/0009168 A1 | 1/2002 | Dick et al. |
| 2007/0291772 A1 | 12/2007 | Andersson et al. |
| 2008/0025208 A1 | 1/2008 | Chan |
| 2008/0201403 A1 | 8/2008 | Andersson et al. |
| 2010/0157901 A1 | 6/2010 | Sanderovitz et al. |
| 2011/0200029 A1 | 8/2011 | Farmandar et al. |
| 2014/0105094 A1* | 4/2014 | Soundararajan ...... H04W 48/16 370/312 |
| 2016/0021526 A1* | 1/2016 | Niu ....................... H04W 74/02 370/230 |

FOREIGN PATENT DOCUMENTS

| | | |
|---|---|---|
| WO | 2013/156056 A1 | 10/2013 |
| WO | 2014/089834 A1 | 6/2014 |
| WO | 2015/020602 A1 | 2/2015 |
| WO | 2015/020603 A1 | 2/2015 |

\* cited by examiner

HETEROGENEOUS DEPLOYMENT OF ACCESS POINT CLUSTERS

CROSS REFERENCE TO RELATED APPLICATIONS

Not Applicable.

FIELD

The present disclosure generally relates to technologies for managing computer networks. Specifically, various techniques and systems are provided for managing clusters of access points, such as multiple clusters of access points that are all present on a single network.

BACKGROUND

An access point cluster is a group of access points which work in unison to allow for a a way to centrally manage multiple access points. In general, one access point is configured as a master device, managing configurations, settings, control, etc., and the other access points act as dependent devices (also referred to as slave devices), receiving configurations, settings, control, etc., from the master device. In this way, an access point cluster provides for a single point of administration for all the access points in the cluster. A network administrator can provide updated configurations and settings to a single master device and that master device can propagate the update to all its dependent devices.

SUMMARY

Generally, only one master device can be present on a local area network (LAN), however, which can create conflicts when a master access points is not properly configured to serve as a master for a particular dependent device. The systems, devices, techniques, and products described herein provide for the ability for multiple clusters to run on a single LAN and/or on a single virtual local area network (VLAN).

In embodiments, for example, an access point that is newly added to a network can evaluate whether any access points clusters are available and attempt to join an access point cluster. The newly added access point can optionally self-evaluate version compatibility, capacity, and/or other criteria to identify candidate clusters to join. Optionally, master access points in existing clusters can evaluate version compatibility, capacity and/or other criteria to determine whether to authorize the newly added access point to join the existing clusters. If no existing clusters are suitable or available for the newly added access point to join, it may establish a new cluster, designated by a new cluster identifier which can distinguish the new cluster from other existing clusters. Optionally, the newly added access point, operating as a new cluster master, can evaluate additional requests from additional newly added access points to join the new cluster.

In a first aspect, provided are methods, such as computer implemented methods. Computer implemented methods of this aspect may be performed by network devices, such as an access point (e.g., a wireless access point compliant with an Institute of Electrical and Electronics Engineers (IEEE) 802.11 standard). In a specific embodiment, a method of this aspect comprises establishing a connection with a network; receiving a cluster identifier, such as a cluster identifier that is associated with a candidate access point cluster (AP cluster), and/or a cluster identifier that distinguishes the candidate AP cluster from another AP cluster connected to the network, and/or a cluster identifier that facilitates multiple AP clusters operating on the network; transmitting a cluster connection request, such as a cluster connection request that includes a request for joining the candidate AP cluster; and receiving a cluster connection response, such as a cluster connection response that is associated with the candidate AP cluster. Optionally, a connection with a network is established using a network transceiver, such as a wireless network transceiver. Optionally, the network is a single layer-2 broadcast domain, such as a virtual local area network (VLAN). Optionally, a cluster identifier is a numeric value, a binary value, a string of characters, etc. In an exemplary embodiment, each cluster connected to the network is associated with an individual cluster identifier; that is, in embodiments, no two clusters are associated with the same cluster identifier.

In some embodiments, a master access point associated with a cluster periodically transmits a cluster beacon message. Cluster beacon messages are useful for allowing access points connected to the network to identify whether a cluster master access point is already present on the network and to identify characteristics about the cluster master access point. For example, a cluster beacon message may include a cluster identifier, cluster version information, cluster size information, cluster capacity information, cluster vendor information, etc. In one embodiment, receiving the cluster identifier includes receiving a cluster beacon message. Optionally, the cluster beacon message corresponds to a message broadcast to the network by a master access point associated with the candidate cluster. Optionally, receiving a cluster identifier includes receiving a plurality of cluster beacon messages, such as, for example, where each cluster beacon message includes a cluster identifier distinguishing an AP cluster associated with the cluster identifier from another AP cluster connected to the network. In embodiments, a cluster beacon is a layer-2 broadcast frame that is transmitted to all other devices on a single VLAN and may contain information as part of the data payload of the frame that identifies cluster information, such as a cluster identifier, version information, etc. The skilled artisan will appreciate that various payload configurations are possible and that the arrangement, identification and format of the cluster identifier, version information, etc., within the payload may vary depending on the specific implementation.

In various embodiments, cluster versions are useful for identifying related and/or compatible access points and/or AP clusters. As used herein, the term version may correspond to one or more of a protocol version, a hardware version, a firmware version, or a code version associated with an access point. For example, access points having incompatible protocol versions may not be capable of communicating with one another and/or may not be configured for communicating with one another. In another example, access points with different versions may be capable of communicating with each other but may not be able to support the same configurations or settings, making clustering less desirable. In an embodiment, a method of this aspect optionally further comprises receiving a cluster version, such as a cluster version that is associated with the candidate AP cluster; and comparing the cluster version with a version for the access point. Optionally, it may be determined whether the cluster version is compatible with an access point.

Optionally, a cluster connection response includes authorization to join the candidate AP cluster, such as if the access point or access point version is determined to be compatible with the cluster version. Optionally, a cluster connection response includes a rejection of a request to join a candidate AP cluster, such as if the access point or access point version is determined to be incompatible with the cluster version. Optionally, the cluster connection request includes a version for the access point and the cluster connection request facilitates a master access point determining compatibility of the version with a cluster version. In this way, version comparison can be performed on either the new access point side or on the cluster side, such as by a master access point associated with the cluster.

Optionally, a method of this aspect further comprises receiving a cluster size, such as a cluster size that is associated with the candidate AP cluster; and determining that the candidate AP cluster has sufficient capacity for a new access point to join the candidate cluster. Optionally, determining includes comparing the cluster size with a maximum cluster size. Optionally, a method of this aspect further comprises receiving a cluster size, such as a cluster size that is associated with an additional candidate AP cluster; and determining that the additional candidate AP cluster has insufficient capacity for a new access point to join the additional AP candidate cluster, wherein determining includes comparing the cluster size with a maximum cluster size. Optionally, the cluster connection request facilitates a master access point determining whether an AP cluster associated with the master access point has sufficient capacity for the network device to join the AP cluster. Again, in this way, capacity determination can be performed on either the new access point side or on the cluster side, such as by a master access point associated with the cluster.

In some embodiments, cluster connection response includes authorization to join the candidate AP cluster. Optionally, methods of this aspect further comprise joining the candidate AP cluster. In one embodiment, joining the candidate AP cluster includes establishing the access point as a new dependent access point associated with the candidate AP cluster. Optionally, joining the candidate AP cluster includes receiving a configuration associated with the candidate AP cluster and installing the configuration.

In some embodiments, the cluster connection response includes a rejection of the request to join the candidate AP cluster. Optionally further attempts to join other clusters are performed. For example, in one embodiment, a method of this aspect further comprises receiving an additional cluster identifier, such as an additional cluster identifier that is associated with an additional candidate AP cluster, and/or an additional cluster identifier that distinguishes the additional candidate AP cluster from the candidate AP cluster and other AP clusters present on the network; transmitting an additional connection request, such as an additional connection request that includes a request for joining the additional candidate AP cluster; receiving an additional connection response, such as an additional connection response that is associated with the additional candidate AP cluster; and joining the additional candidate AP cluster.

Optionally, the cluster connection response includes an additional cluster identifier, such as an additional cluster identifier that is associated with an additional candidate AP cluster. Optionally, a method of this aspect further comprises transmitting an additional connection request, such as an additional connection request that includes a request for joining the additional candidate AP cluster; receiving an additional connection response, such as an additional connection response that is associated with the additional candidate AP cluster; and joining the additional candidate AP cluster.

In some embodiments, a new access point may not be able to join any existing AP clusters present on the network. Optionally, a new access point may establish a new AP cluster. For example, in one embodiment, the cluster connection response includes a rejection of the request to join the candidate AP cluster, such that the method further comprises establishing a new master access point associated with a new AP cluster. In a specific embodiment, a method of this aspect further comprises determining that the access point is unable to join any existing AP clusters connected to the network and establishing the access point as a new master access point associated with a new AP cluster. Optionally, establishing includes generating a new cluster identifier, such as a new cluster identifier that distinguishes the new AP cluster from the candidate AP cluster and/or other AP clusters connected to the network. Optionally, establishing includes transmitting a new cluster beacon message, such as a new cluster beacon message that includes the new cluster identifier. Optionally, establishing includes monitoring for requests to join the new AP cluster.

Optionally, the cluster connection response includes a rejection of the request to join the candidate AP cluster, such that the method further comprises receiving an additional cluster identifier, such as an additional cluster identifier that is associated with an additional candidate AP cluster, and/or an additional cluster identifier that distinguishes the additional candidate AP cluster from the candidate AP cluster and other AP clusters present on the network; transmitting an additional connection request, such as an additional connection request that includes a request for joining the additional candidate AP cluster; receiving an additional connection response, such as an additional connection response that is associated with the additional candidate AP cluster, and/or an additional cluster connection response that includes a rejection of the additional request to join the additional candidate AP cluster; establishing the access point as a new master access point associated with a new AP cluster. Optionally, establishing includes generating a new cluster identifier, such as a new cluster identifier that distinguishes the new AP cluster from the candidate AP cluster and the additional candidate AP cluster. Optionally, establishing includes transmitting a new cluster beacon message, such as a new cluster beacon message that includes a new cluster identifier. Optionally, establishing includes monitoring for requests to join the new AP cluster.

Various techniques are useful for identification of a candidate AP cluster. For example, in some embodiment, multiple cluster identifiers are received, such as where each cluster identifier is associated with a different AP cluster. Identification of the candidate AP cluster optionally comprises identifying the candidate AP cluster from the different AP clusters. Optionally, identifying includes comparing sizes of each different AP cluster and identifying the candidate AP cluster using the sizes. Optionally, identifying includes identifying compatibility of the access point with each the different AP clusters and identifying the candidate AP cluster from the different AP clusters compatible with the access point.

In various embodiments, methods of this aspect further comprise determining one or more cluster criteria. Optionally, identifying the candidate AP cluster includes using the cluster criteria. Useful cluster criteria include, but are not limited to, a cluster size, a cluster capacity, a cluster version, a network latency between the access point and a cluster master access point, a cluster master access point connection speed, a cluster master access point processing power, a cluster master access point memory size, a cluster master access point hardware configuration, a cluster master access point software configuration, a cluster master access point location, a distance between the access point and a cluster master access point, and any combination of these. Optionally, cluster criteria received from different AP clusters are compared and the comparison facilitates identification of a candidate AP cluster. If a new access point is unable to join a first candidate AP cluster, a second candidate AP cluster may be identified and the new access point may attempt to join the second candidate AP cluster.

Optionally, when multiple clusters are connected to a network, the clusters may organize themselves into a cluster of cluster configuration, also referred to herein as a supercluster. Use of supercluster configurations are beneficial for a variety of reasons, including facilitating the management of multiple clusters, such as by propagating cluster configuration changes from a single central master cluster or super master to one or more dependent clusters, similar to the operation of a single cluster. Supercluster configurations may also be beneficial for integration of third party services with a network on which clusters are operating. A third party service, such as a network service, may require only a connection to the master cluster and requests for services from the third party service provider may be routed to and/or through the master cluster for all dependent clusters.

In one embodiment, a method of this aspect further comprises establishing the access point as a new master access point associated with a new AP cluster; establishing a communication channel between the access point and a master access point associated with another AP cluster; and identifying a super master access point from among the new master access point and the master access point. Optionally, super master serves as a gateway for receipt of instructions or configuration changes to be delivered to a plurality of master access points connected to the network. Optionally, identifying the super master access point includes electing the super master access point from among the new master access point and the master access point. Optionally, identifying the super master access point includes receiving a signal indicating that the master access corresponds to the super master access point. Optionally, identifying the super master access point includes transmitting a signal indicating that the new master access corresponds to the super master access point.

As related to above, third party services may optionally be provided to clusters within a supercluster, access points within a cluster and client devices connected to access points. For example, a third party service provider may be provided by a network server, such as a network server connected to the network or a network server accessible through the network, such as by way of one or more gateway or router devices. In one embodiment, a method of this aspect further comprises establishing the access point as a new master access point associated with a new AP cluster; establishing cluster connection with a new dependent access point; receiving a network service request, such as a network service request that is associated with a wireless client device connected to the new dependent access point; forwarding the network service request a server providing network services; receiving a network service response associated with the network service request; and forwarding the network service response to the new dependent access point.

In another embodiment, a method of this aspect further comprises establishing the access point as a new master access point associated with a new AP cluster; establishing a wireless association with a wireless client device; receiving a network service request, such as a network service request that is associated with the wireless client device; forwarding the network service request to a server providing network services; and receiving a network service response associated with the network service request. Optionally, a method of this aspect further comprises transmitting the network service response to the wireless client device.

Optionally, a network controller may evaluate access points present on the network and determine and communicate the status of the access points as master access points or a dependent access points. Similar to the above description, the controller may use version information, cluster size information, etc., when determining which cluster or new cluster a newly added access point is to become a member of. For example, a controller may receive one or more requests from a newly added access point to discover and/or join a cluster and respond with information identifying the newly added access point as a new cluster master or as a dependent device belonging to an existing cluster with a specified master device. Optionally, a controller may transmit commands to an access point that is already established as a member of a particular cluster in order to instruct the access point to join or start another cluster. In this way, access points on the network can be centrally managed and discover which clusters they belong to by communicating with a network controller.

In another embodiment, a method of this aspect further comprises establishing the access point as a new dependent access point associated with the candidate AP cluster; establishing a wireless association with a wireless client device; receiving a network service request, such as a network service request that is associated with the wireless client device; forwarding the network service request to a master access point associated with the candidate AP cluster, such as a master access point that serves as a gateway for delivering network service requests to a server providing network services and/or for receiving network service responses from the server; and receiving a network service response. Optionally, a method of this aspect further comprises transmitting the network service response to the wireless client device.

In other aspects, systems are provided, such as systems for achieving and/or performing the methods described herein. In exemplary embodiments, a system of this aspect comprises one or more processors and a non-transitory computer readable storage medium communicatively coupled or otherwise positioned in data communication with the one or more processors. Optionally, a system of this aspect further comprises one or more network transceivers coupled with the one or more processors, such as one or more wireless network transceivers. Useful wireless network transceivers include those compliant with an IEEE 802.11 specification. In embodiments, the non-transitory computer readable storage medium includes instructions that, when executed by the one or more hardware processors, cause the one or more hardware processors to perform one or more of the methods described herein.

For example, in a specific embodiment, a system of this aspect comprises one or more processors, and a non-transitory computer readable storage medium coupled with the one or more processors and including instructions that, when executed by the one or more processors, cause the one or more processors to perform operations including various steps of the method embodiments described above.

In other aspects, computer program products are provided, such as computer program products configured to achieve and/or perform methods described herein. In exemplary embodiments, a computer program product of this aspect is a non-transitory computer readable storage medium comprising instructions that, when executed by one or more hardware processors, cause the one or more hardware processors to perform one or more of the methods described herein.

For example, in a specific embodiment, a computer program product of this aspect comprises a non-transitory computer readable storage medium comprising instructions that, when executed by one or more processors, cause the one or more processors to perform operations including various steps of the method embodiments described above.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures.

DETAILED DESCRIPTION

Figure 1:
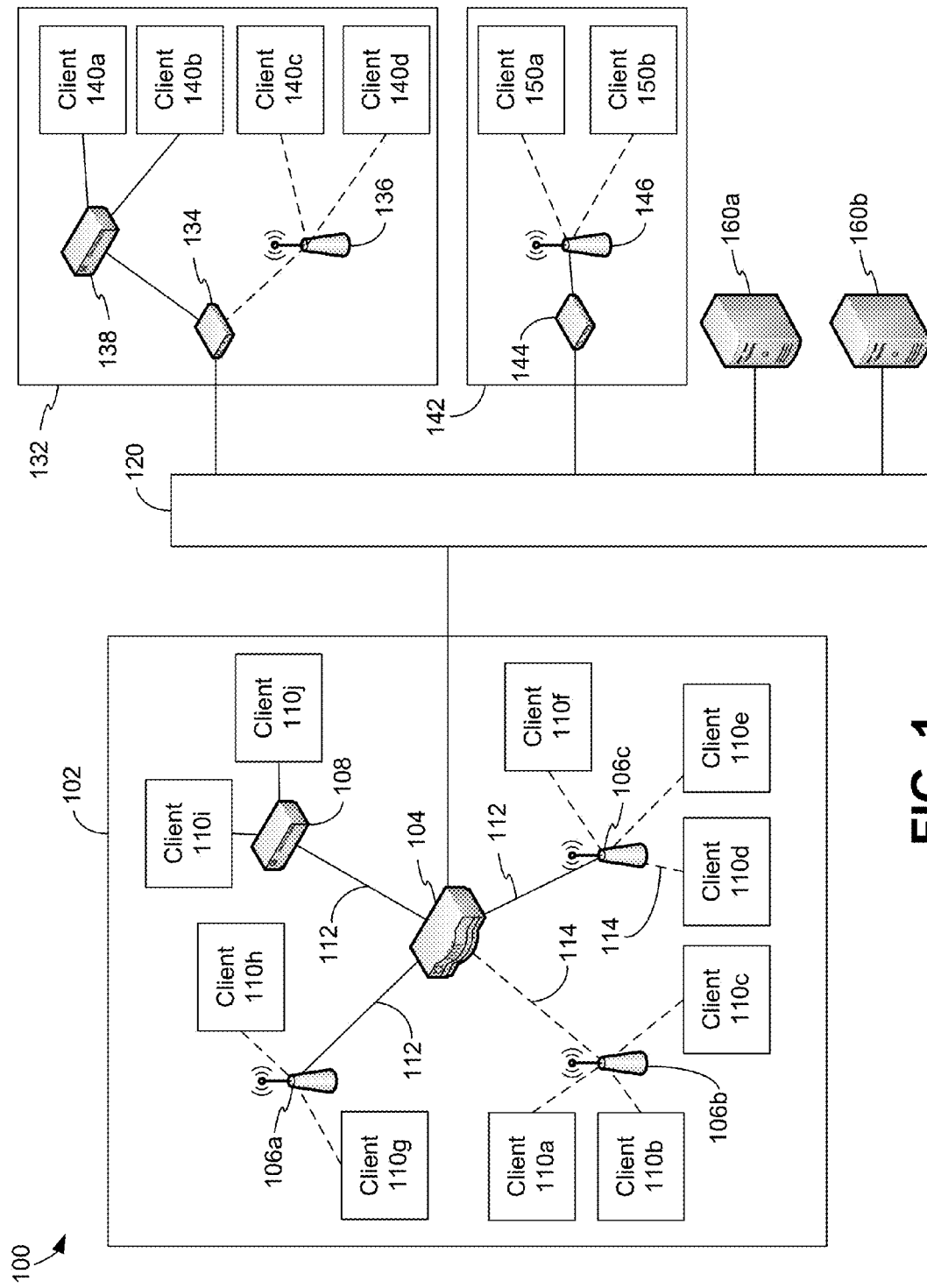
FIG. 1 illustrates a network configuration in accordance with some embodiments.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, an algorithm, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

FIG. 1 illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, also in communication with the network 120.

The main office 102 may include a primary network, possibly also called a corporate network, enterprise network, or a home network. The main office 102 network may be a private network. A private network is a network that may include security and access controls, such that only authorized users may access the private network. Authorized users may include, for example, employees of a company located in the main office 102.

In the illustrated embodiment, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 functions as a router for the devices in the main office 102.

A controller 104 may be any device that is operable to configure and manage network devices, such as in the main office 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points 106a, 106b, and 106c. Switch 108 and wireless access points 106a-106c provide network connectivity to various client devices 110a, 110b, 110c, 110d, 110e, 110f, 110h, 110i, and 110j. Using a connection to switch 108 or access point 106a-106c, a client device 110a-110j is able to access network resources, including other devices on the network and the network 120.

Client devices 110a-110j include any hardware device that includes processing circuitry running at least one process adapted to control the flow of traffic to and/or from the device. Client devices may also include user input and output interfaces and communication interfaces, such as a radio for wireless communication and/or a physical connector for wired communication. Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, printers, and the like.

Within the main office 102, a switch 108 is included as one example of a point of access to the network for wired client devices 110i and 110j. Client devices 110i and 110j may connect to the switch 108 and, through the switch 108, may be able to access other devices within the network configuration 100. The client devices 110i and 110j may also be able to access the network 120, through the switch 108. The client devices 110i and 110j may communicate with the switch 108 over a wired connection 112. In the illustrated example, the switch 108 communicates with the controller 104 over a wired connection 112, though this connection may also be wireless.

Wireless access points 106a-106c are included as another example of a point of access to the network for client devices 110a-110h. An access point 106a-106c is a combination of hardware, software, and/or firmware that is configured to provide wireless network connectivity to wireless client devices 110a-110h. In the illustrated embodiment, the access points 106a-106c can be managed and configured by the controller 104. The access points 106a-106c communicate with the controller 104 over either a wired connection 112 or a wireless connection 114.

Client devices within a network (e.g. wireless local area networks, or "WLANs") communicate with access points in order to obtain access to one or more network resources. An access point, also referred to herein as an "AP", may include a digital device that operates as a gateway for a client device to establish a connection (e.g., a communicative coupling) with one or more networks (e.g., the Internet, an intranet, a local area network, etc.). For example, an access point may be implemented as a wireless access point (WAP), which is configured to communicate wirelessly with one or more client devices as well as communicate with other network devices associated with the one or more networks, such as a controller, router, or switch, for example, through a wired or wireless connection.

The network configuration 100 may include one or more remote sites 132, 142. A remote site 132 may be located in a different physical or geographical location from the main office 102. In some cases, the remote site 132 may be in the same geographical location, or possibly the same building, as the main office, 102, but may lack a direct connection to the network located within the main office 102, relying instead on a connection over network 120. A remote site 132 such as the one illustrated may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate with the network 120. The remote site 132 may also include a switch 138, router, and/or access point 136 in communication with the gateway 134 over either wired or wireless connections. The switch 138, router, and access point 136 provide connectivity to the network for various client devices 140a, 140b, 140c, and 140d.

In various embodiments, the remote site 132 is in direct communication with main office 102, such that client devices 140a-140d at the remote site 132 access the network resources at the main office 102 as if these clients 140a-140d were located at the main office 102. In such embodiments, the remote site 132 is managed by the controller 104 at the main office, and the controller 104 provides the necessary connectivity, security, and accessibility that enable communication between the remote site 132 and the main office 102. Once connected to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless access point 146, by which various client devices 150a and 150b access the network 120. Such a remote site 142 may represent, for example, an individual employee's home or a temporary remote office. The remote site 142 may also be in direct communication with the main office 102, such that the client devices 150a and 150b at remote site 142 access network resources at the main office 102 as if client devices 150a and 150b were located at the main office 102. The remote site 142 may be managed by the controller 104 at the main office 102 to make this transparency possible. Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include any number of intermediate network devices, such as switches, routers, gateways, servers, and/or controllers, that are not directly illustrated as part of the network configuration 100 but that facilitate communication between the various parts of the network configuration 100, and between the network configuration 100 and other network-connected entities. The network 120 may include various content servers 160a and 160b. Content servers 160a and 160b may include various providers of multimedia downloadable and/or streaming content, including audio, video, graphical, and/or text content, or any combination thereof. Examples of content servers 160a and 160b include, for example, web servers, streaming radio and video providers, and cable and satellite television providers. The client devices 110a-110j, 140a-140d, and 150a-150b may request and access the multimedia content provided by the content servers 160a and 160b.

Figure 2:
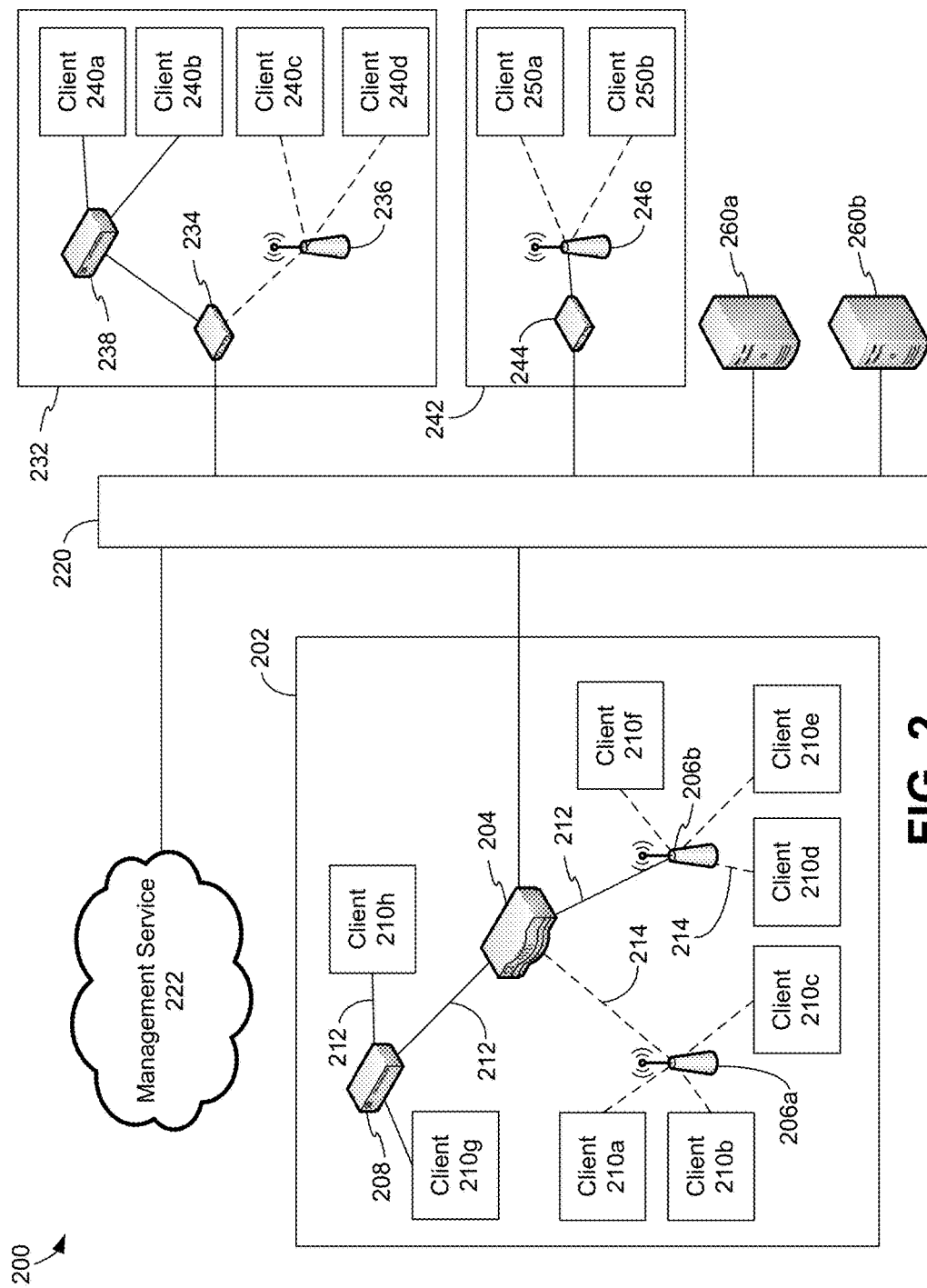
FIG. 2 illustrates a network configuration in accordance with some embodiments.

FIG. 2 illustrates an embodiment of a network configuration 200 that includes a cloud-based management service 222. The network configuration 200 may be implemented for a multi-user organization. The network configuration 200 includes a main office 202 in communication with a network 220, and may also include one or more remote sites 232, 242, also in communication with the network 220. In the illustrated embodiment, the main office 202 includes a gateway device 204, such as a router, for communicating with the network 220. A single gateway device 204 is illustrated, though the main office 202 may include multiple gateway devices and/or multiple communication points with the network 220.

The gateway device 204 may be in communication with one or more switches 208 and/or wireless access points 206a and 206b. Switch 208 and access points 206a and 206b provide network connectivity to various client devices 210a, 210b, 210c, 210d, 210e, 210f, 210g, and 210h. Using a connection to switch 208 or access points 206a, 206b, a client device 210a-210h is able to access network resources, including other devices on the network and the network 220.

A switch 208 is included as an example of a point of access to the network for client devices 210g-210h. Client devices 210g-210h may communicate with the switch 208 over a wired connection 212. Wireless access points 206a-206b are included as another example of a point of access to the network for client devices 210a-210f. Client devices 210a-210f may communicate with the access points 206a-210b over wireless connections 214. The access points 206a-b may themselves communicate with the gateway device 204 over either wired connections 212 or wireless connections 214.

In the embodiment illustrated, the network configuration 200 includes a cloud-based management service 222. The management service 222 may include various software and software processes for configuring and/or managing network devices at the main office 202.

Management tasks may include, for example, access, authentication, security, hardware management, configuration and setup, and/or internal and/or external communication. The management service 222 may be running on a server local to the main office 202, or a server located remotely from the main office 202, or may be distributed across any number of local and/or remote servers. In embodiments where the management service 222 is located remote to the main office 202, the management service 222 may access the main office 202 over the network 220 or by way of gateway device 204.

The network configuration 200 may include one or more remote sites 232, 242. A remote site 232 may include a gateway device 234 for communicating with the network 220. The remote site 232 may also include a switch 238, router, and/or access point 236 in communication with the gateway device 234 over either wired or wireless connections. The switch 238 and access point 236 provide connectivity to the network 220 for various client devices 240a, 240b, 240c, and 240d.

In various embodiments, the remote site 232 may be configured and/or managed by the management service 222, such that client devices 240a-240d at the remote site 232 access the network resources at the main office 202 as if these clients 240a-240d were located at the main office 202. The management service 222 provides all, or parts of, the necessary connectivity, security, and accessibility that enable communication between the remote site 232 and the main office 202.

In various embodiments, the network configuration 200 may also include one or more smaller remote sites 242, comprising only a gateway device 244 for communicating with the network 220 and a wireless access point 246, by which various client devices 250a and 250b access the network 220. The remote site 242 may also be configured and/or managed by the management service 222, such that the client devices 250a-250b at the remote site 242 access network resources at the main office 202 as if these client devices 250a-250b were located at the main office 202. The management service's 222 control over the remote site 242 makes this transparency possible.

The network 220 may be a public network, such as the Internet. The network 220 may include various content servers 260a and 260b. The client devices 210a-210h, 240a-240d, 250a-250b may request and access data and content provided by the content servers 260a-260b over their connection to the network 220.

Figure 3:
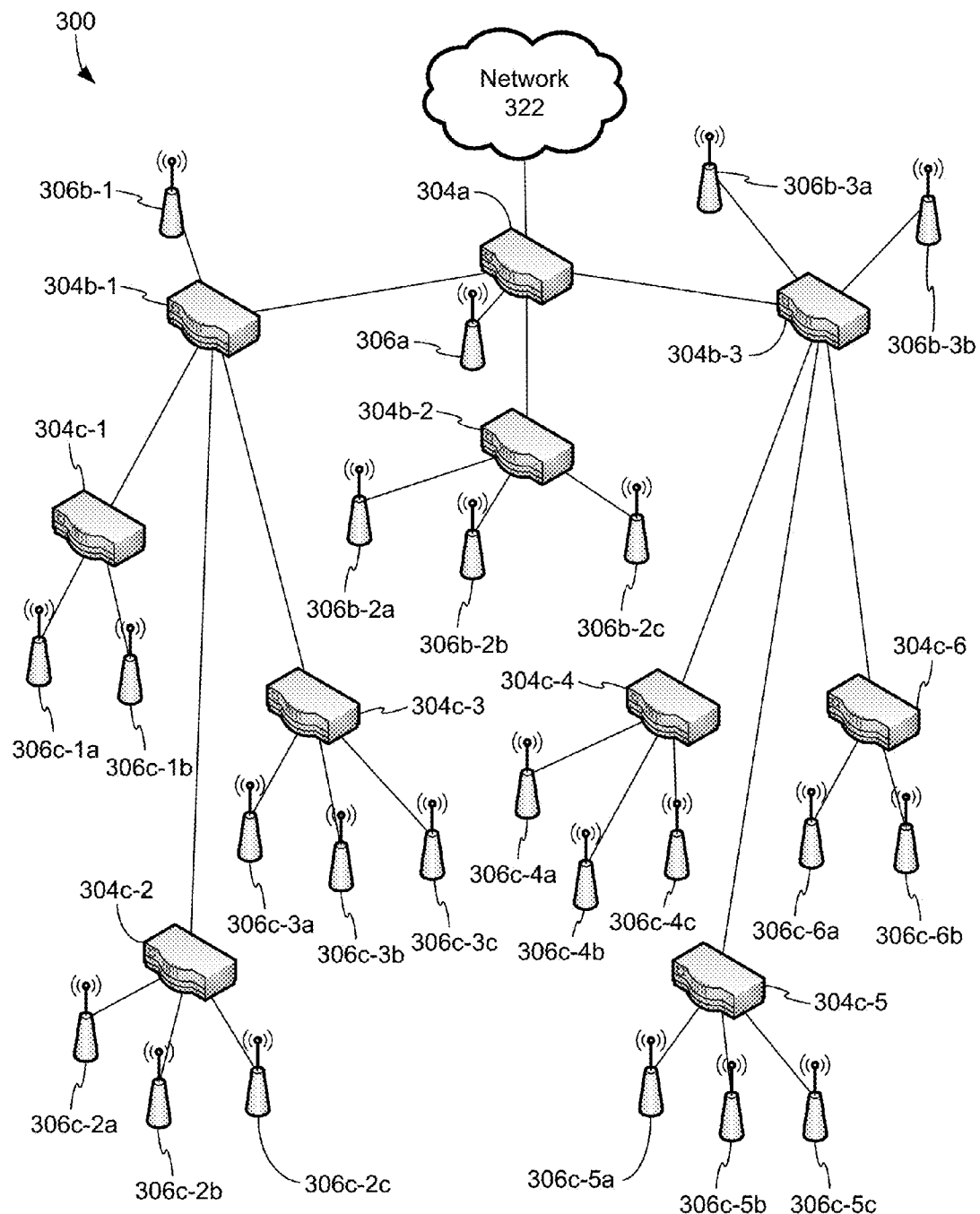
FIG. 3 illustrates a network configuration in accordance with some embodiments.

FIG. 3 illustrates another embodiment of a network configuration 300, according to embodiments of the present technology. Specifically, illustrated in FIG. 3 is an example showing a variety of network devices 304a, 304b-1, 304b-2, 304b-3, 304c-1, 304c-2, 304c-3, 304c-4, 304c-5, and 304c-6 that interconnect a variety of wireless access points 306a, 306b-1, 306b-2a, 306b-2b, 306b-2c, 306b-3a, 306b-3b, 306c-1a, 306c-1b, 306c-2a, 306c-2b, 306c-2c, 306c-3a, 306c-3b, 306c-3c, 306c-4a, 306c-4b, 306c-4c, 306c-5a, 306c-5b, 306c-5c, 306c-6a, and 306c-6b.

Collectively, network devices 304b-1, 304b-2, and 304b-3 may be referred to herein as network devices 304b. Collectively, network devices 304c-1, 304c-2, 304c-3, 304c-4, 304c-5, and 304c-6 may be referred to herein as network devices 304c. Collectively, network devices 304a, 304b, and 304c may be referred to herein as network devices 304. Collectively, access points 306b-2a, 306b-2b, and 306b-2c may be referred to herein as access points 306b-2. Collectively, access points 306b-3a and 306b-3b may be referred to herein as access points 306b-3. Collectively, access points 306b-1, 306b-2, and 306b-3 may be referred to herein as access points 306b. Collectively, access points 306c-1a and 306c-1b may be referred to herein as access points 306c-1. Collectively, access points 306c-2a, 306c-2b, and 306c-2c may be referred to herein as access points 306c-2. Collectively, access points 306c-3a, 306c-3b, and 306c-3c may be referred to herein as access points 306c-3. Collectively, access points 306c-4a, 306c-4b, and 306c-4c may be referred to herein as access points 306c-4. Collectively, access points 306c-5a, 306c-5b, and 306c-5c may be referred to herein as access points 306c-5. Collectively, access points 306c-6a and 306c-6b may be referred to herein as access points 306c-6. Collectively, access points 306c-1, 306c-2, 306c-3, 306c-4, 306c-5, and 306c-6 may be referred to herein as network devices 306c. Collectively, access points 306a, 306b, and 306c may be referred to herein as access points 306.

Network devices 304 each independently represent a switch, hub, or other interconnecting network bridge device and may optionally include other functionality such as router functionality, gateway functionality, network management functionality, etc. As illustrated, network devices 304 interconnect with one another, with network 322, and with access points 306.

Access points 306 each independently represent a network device including a wireless interface for connecting wireless client devices to network configuration 300. A variety of hardware configurations may be represented by access points 306, though any two or more access points 306 may share a common hardware configuration. Similarly, a variety of software and/or firmware configurations may be present on, running on, or otherwise installed on access points 306, though any two or more access points 306 may share a common software and/or firmware configuration.

Each network device 304 can interconnect with one or more other network devices and/or with one or more access points 306. The various network devices 304 and access points 306 may be located in the same location, such as for example in a main office. Alternatively or additionally, some of the network devices 304 and access points 306 may be located at remote sites, and communicate with the other network devices and access points over a combination of networks that may include the Internet.

Various Institute of Electrical and Electronics Engineers (IEEE) specifications describe physical and data link layer specifications for network communications between devices. For example, IEEE 802 local area networks include data link layer specifications for wired and wireless local area networks. At the data link layer, also referred to herein as the link layer or layer 2, devices can communicate with one another on a node-to-node or broadcast basis, such as by transmitting data frames on a shared network medium (e.g., twisted pair cables, radio, etc.) and employing addresses (e.g., media access control (MAC) addresses) to ensure appropriate frame delivery.

On a single layer 2 broadcast domain, also referred to as a virtual local area network (VLAN), devices can reach one another by broadcast at the data link layer. When operating on a single local area network (LAN), separate VLANs can be isolated from one another so that devices on distinct VLANs cannot broadcast to one another. In this way, distinct layer 2 networks can be created on a single local area network, similar to the concept of subnetting on a layer 3 network. Routers or appropriately configured network switches or other hardware can be used for forwarding data frames to and from one VLAN to another, when necessary.

If configured as a single layer-2 broadcast domain or virtual local area network (VLAN), network configuration 300 could only include a single access point cluster using conventional access point clustering techniques. Such a limitation may be due, in part, to master access points being configured to be a master of all dependent access points reachable by a layer-2 broadcast. In addition, there may further be a limit on the number of access points that can be present on a single VLAN using conventional access point clustering techniques, which may correspond to a cluster size limit, such as a limit of 128 access points within a cluster or a limit of 256 access points within a cluster.

Advantageously, aspects described herein, however, provide for the ability to deploy multiple access point clusters on a single VLAN and for the ability to deploy more than a number of access points, corresponding to the cluster size limit, on a single VLAN. In fact, in some embodiments, each individual access point can correspond to an individual access point cluster with all clusters connected to the same VLAN, though such a configuration would minimize the efficiency gains achieved through use of access point clusters including multiple access points. The ability to deploy a number of access points greater than a cluster size limit on a single VLAN may arise from multiple clusters being able to be deployed on the single VLAN. The number of individual clusters present on a single VLAN may be limited in practice, such as by the number of bits used for an identifier that distinguishes one cluster from another.

As illustrated, any one or more of access points 306 may be configured as a master or primary access point for managing or controlling a cluster of other access points 306. For example, access point 306b-1 may be configured as a master access point for controlling one or more access points, such as access points 306a, 306c-1, 306c-4, 306c-5a, and 306c-6b, and may be grouped within an access point cluster including these other access points. Alternatively, access point 306a may be configured as a master access point for controlling the group of 306b-1, 306c-1, 306c-4, 306c-5a, and 306c-6b. Other examples are possible As another example, if only two access point clusters are running on the VLAN, the remaining access points 306b-2, 306b-3, 306c-2, 306c-3, 306c-5b, 306c-5c, and 306c-6a may correspond to the second access point cluster, with any one of these access points being established as the master access point for this group. The above example of access point clusters is provided as an example. Other configurations are possible.

In embodiments, any of access points 306 may be configured as a master or primary access point for managing or controlling a cluster of other access points 306. In the example clusters described above where access points 306a, 306b-1, 306c-1, 306c-4, 306c-5a, and 306c-6b are part of a first cluster, such as a cluster designated by a first cluster identifier and access points 306b-2, 306b-3, 306c-2, 306c-3, 306c-5b, 306c-5c, and 306c-6a are part of a second clusters, such as a cluster designated by a second cluster identifier, two access points will be established as master access points—one for the first cluster and one for the second cluster, with all other access points being designated as dependent access points. For example, master access points may be established using election techniques understood by the skilled artisan. In another example, a centralized network device, such as a controller, may determine which access points are to operate as master access points.

In embodiments, the grouping of access points within clusters may be determined based on a version associated with each access point. For example, each access point may only be able to join a cluster with other access points running a compatible version. As used herein, the term version may correspond to one or more of a protocol version, a hardware version, a firmware version, or a code version associated with an access point. For example, access points having incompatible protocol versions may not be capable of communicating with one another and/or may not be configured for communicating with one another. As another example, access points sharing a common hardware version may be capable of all running a same firmware version, and an access point cluster may require that all access point members run the same firmware version, such that access points sharing a different hardware version may not be capable of joining the cluster if the hardware is incompatible with the firmware version running on the cluster. Other compatibility scenarios are possible. Example version numbers may be provided throughout this description. The skilled artisan will understand that the version numbers recited are merely exemplary and serve to more clearly explain aspects of the invention in a context familiar to the skilled artisan. Thus, the version numbers recited should not be interpreted as limiting in any way.

In conventional access point clustering technology, if a new access point is added to a VLAN but the new access point is incompatible with a version associated with a cluster already present on the VLAN, the newly added access point may not be configurable or usable within the cluster or configurable or usable at all, depending on the network and access point configuration. A similar situation may arise if no capacity is available for new access point clusters to be added to the cluster present on the VLAN and a new access point is added to the VLAN. In some instances, the new access point may require establishing a new VLAN in order for configuration and/or to change the version associated with the new access point to a version compatible with the existing cluster, which may require significant time and effort on the part of a network administrator. In some instances, the newly added access point may not be upgradeable or downgradeable to a version associated with the cluster. In such a situation, adding the new access point to the cluster would require changing a version of the cluster to a version compatible with the new access point, which may require additional efforts on the part of a network administrator and may result in down-time for one or more of the access points, which may be unacceptable for critical infrastructure. In instances where capacity of the existing cluster cannot be increased, it may be impossible to add the new access point to the cluster without creation of a new VLAN and new cluster on the new VLAN.

Aspects described herein advantageously eliminate the above problem, due to an access point which is newly added to a VLAN having the option of joining an existing access point cluster or establishing a new access point cluster if no existing access point clusters already present on the VLAN are compatible with the new access point or have capacity for the new access point. In this way, network down-time may be minimized as all newly added access points are guaranteed to be configurable within a new or existing cluster on the VLAN.

Optionally, network devices 304 may include functionality for controlling or managing access points 306. For example, network device 304a may serve as a central controller for managing access point clusters. Network devices 304 may also provide services to other network devices 304, access points 306, and wireless client devices connected to access points 306. For example, network devices 304 may provide routing services, encryption services, authorization services, etc. In addition, other servers present within network 322 may provide additional services to access points 306 and connected wireless client devices.

Figure 4:
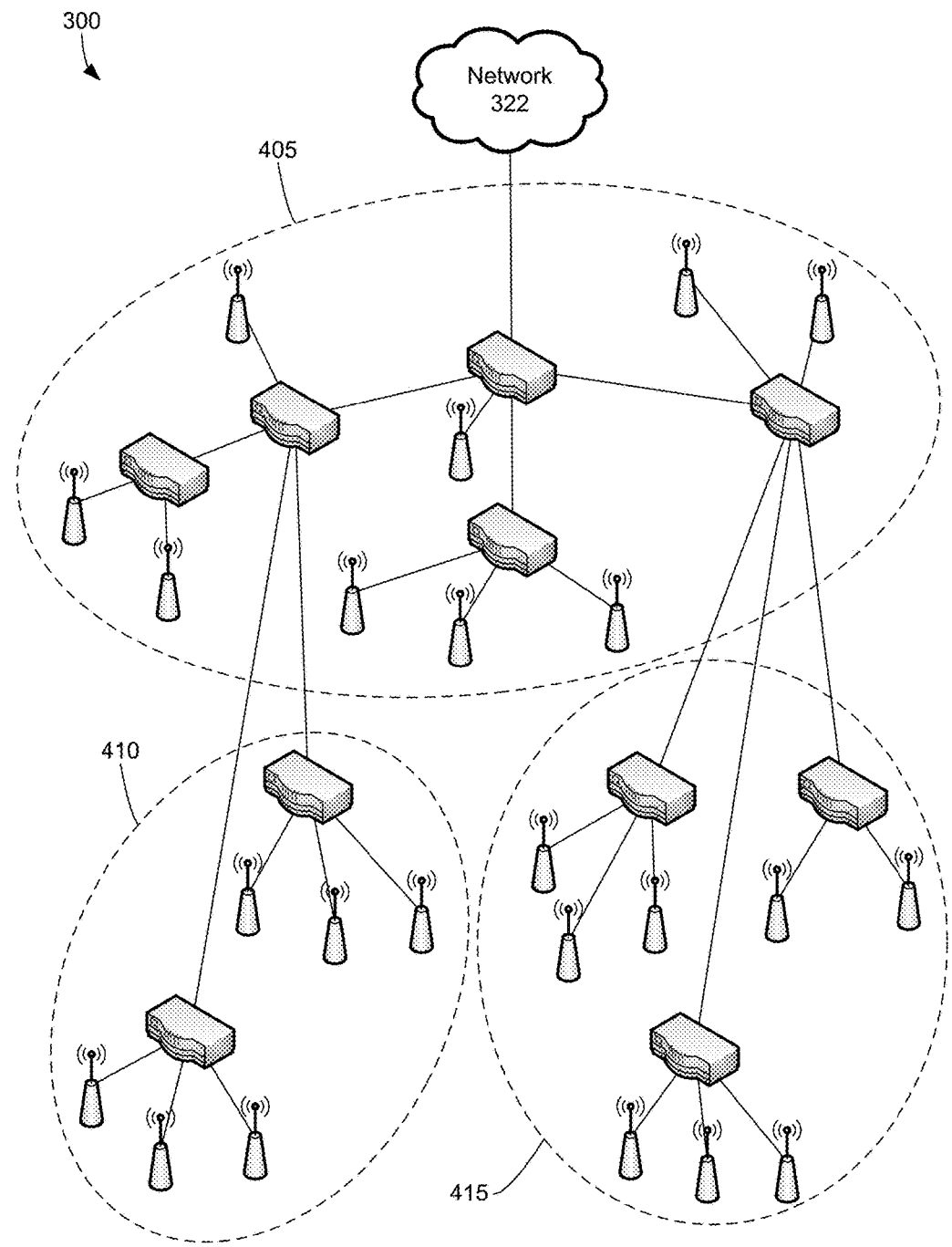
FIG. 4 illustrates a network configuration in accordance with some embodiments.

FIG. 4 provides another illustration of network configuration 300 in which VLANs are configured. In FIG. 4, network configuration 300 is illustrated as including three VLANs: VLAN 405, VLAN 410, and VLAN 415. VLAN 405 includes access points 306a, 306b, and 306c-1. VLAN 410 includes access points 306c-2 and 306c-3. VLAN 415 includes access points 306c-4, 306c-5, and 306c-6. Using conventional access point clustering technology, there can be only one access point cluster and one master access point within each VLAN. Although different VLAN configurations are possible, such as a VLAN configuration where VLANs are established on a port-by-port basis for network devices 304a, 304b and/or 304c, each VLAN is still limited to a single access point cluster using conventional technology.

In various embodiments of the present technology, however, each of VLAN 405, 410, and 415 can include one or more access point clusters. For example, as illustrated, VLAN 405 may include as many as 9 access point clusters, as 9 access points are represented in VLAN 405. Similarly, VLAN 410 could correspond to as many as 6 access point clusters and VLAN 415 could correspond to as many as 8 access point clusters. Solely using single access point cluster configurations may be sub-optimal however, as benefits can be achieved through the use of multiple access point clusters, such as a reduction in configuration steps, time, and costs.

Other VLAN configurations are possible, including where one or more network devices 304 and/or access points 306 are located in different VLANs. For example, although network device 304b-1 is shown as part of VLAN 405, access point 306b-1 may be configured as part of VLAN 410 or VLAN 415. Network devices 304b-1, 304c-2, and/or 304c-3 can be appropriately configured for including any one or more of access points 306 as part of any of VLANs 405, 410, or 415, as will be understood by the skilled artisan.

Figure 5:
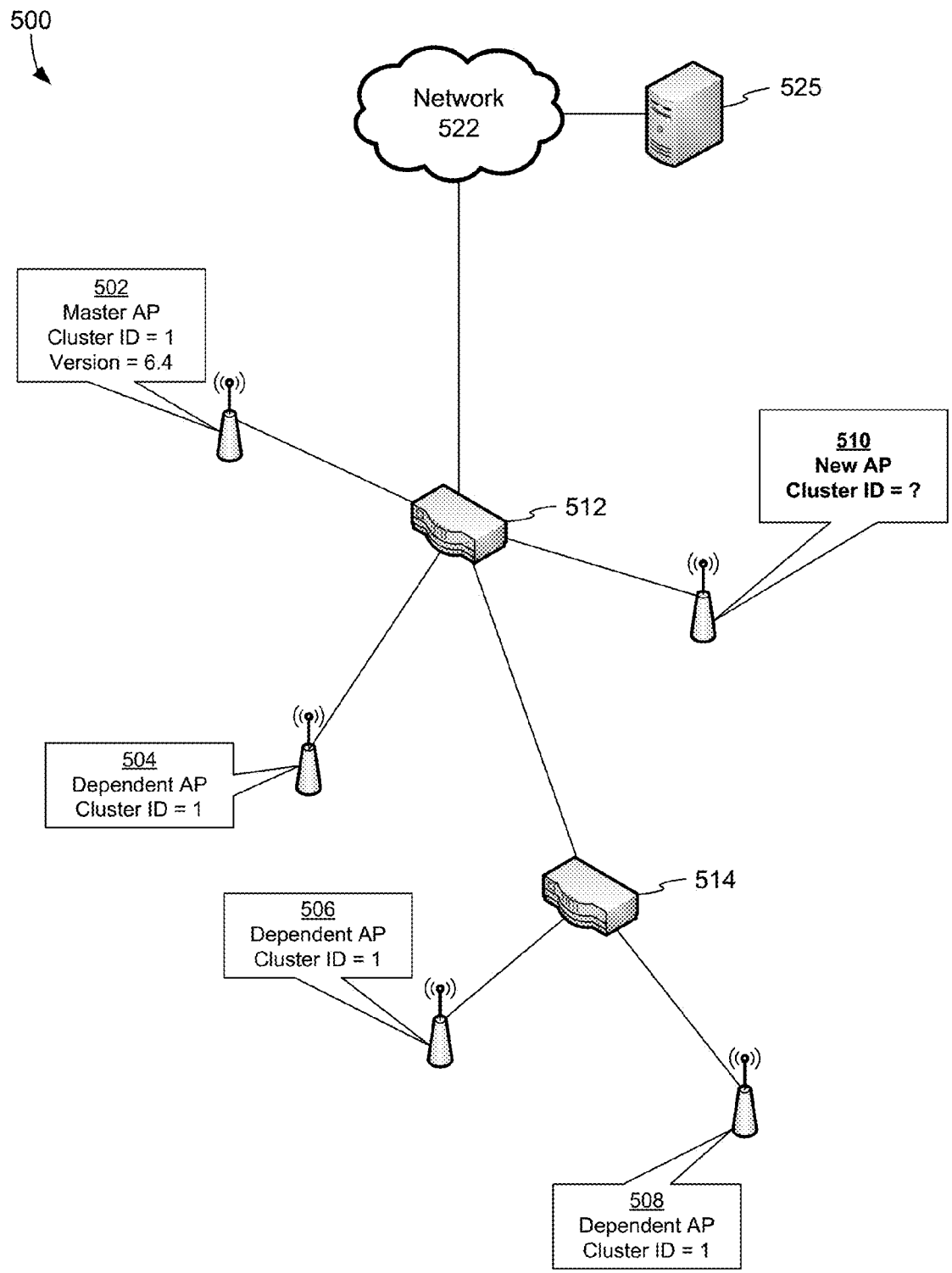
FIG. 5 illustrates a network configuration in accordance with some embodiments.

FIG. 5 illustrates another network configuration 500, which may represent a subset of network configuration 300, for example. In FIG. 5, various access points 502, 504, 506, and 508 are connected to one another and network 522 by way of network devices 512 and 514. As illustrated, access points 502, 504, 506, 508, and 510 and network device 512 and 514 are configured as a single layer-2 broadcast domain (VLAN).

In addition, server 525 may provide additional services to access points 502, 504, 506, 508, and 510 and connected wireless client devices. For example, server 525 may provide authentication services, network access control, directory services, file services, and other network services. In one embodiment, server 525 represents a Remote Authentication Dial In User Service (RADIUS) server.

Advantageously, the use of access point clusters simplify connection of access points within the cluster to server 525 and/or configuration of server 525. For example, the master access point 502 may serve as a gateway or intermediate device providing a central connection point to server 525 for corresponding dependent access points 504, 506, and 508 within the cluster. Optionally, requests for network services are routed though the master access point, which then forwards the service requests on to server 525. A response from server 525 may be transmitted to the master access point, which then directs the response to the appropriate access point within the cluster for further action. For example, in some embodiments, the service request may correspond to wireless client device's network access request and the response may correspond to authorization for network access or denial of network access, which may be acted upon by the access point that the wireless client device is associated with.

In FIG. 5, access point 510 is an access point that is newly connected to the VLAN and not yet configured as member of an access point cluster. Access point 502 is configured as a master access point for the cluster, and is identified by a first cluster ID. As illustrated the first cluster ID has a value of 1, which may be a default value. Access points 504, 506, 508 are configured as dependent access points for the cluster identified by cluster ID 1.

In an exemplary embodiment, upon powering up and/or connecting to the VLAN for the first time, access point 510 may self-identify which access point cluster to join or determine that it needs to establish a new access point cluster. Optionally, a rediscovery process may be initiated on an access point, at which time it will undertake the self-identification process or new access point cluster establishment process. In embodiments, a rediscovery process may be initiated by resetting an access point to factory defaults, setting a flag or configuration setting of the access point, and/or initiating a power cycle or reset cycle.

As illustrated, access point 502 operates using version 6.4, which may represent a software version, a code version, a protocol version, a hardware version, etc. Access point 510 operates according to a version, such as a version that may be compatible or incompatible with the version running on access point 502. Additionally or alternatively, access point 510 may or may not be upgradeable to the version running on access point 502. Depending on compatibility or capacity, access point 510 may be able to join the access point corresponding to cluster ID 1 or may need to establish a new access point cluster.

Figure 6A:
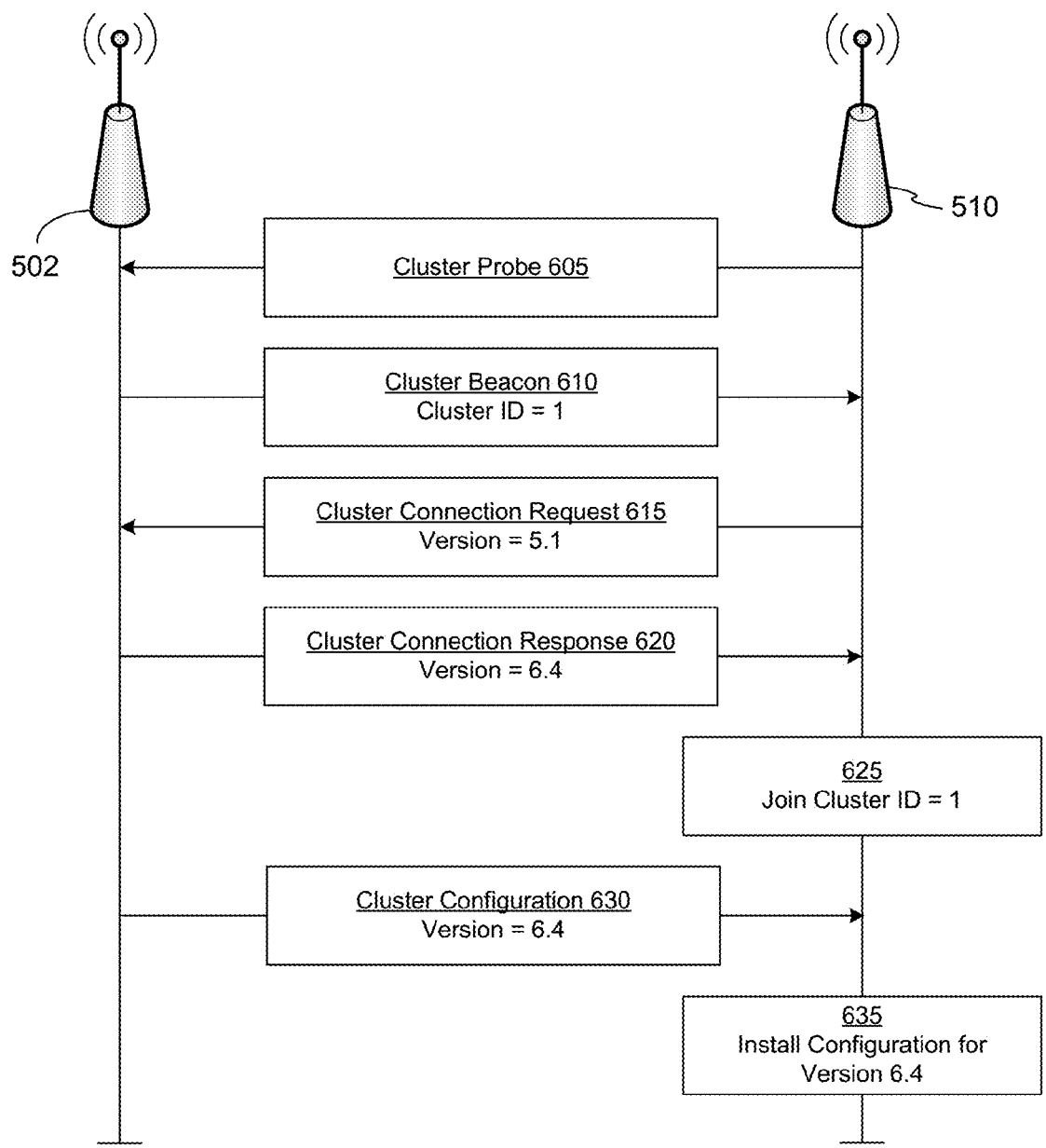
FIG. 6A illustrates an overview of the exchange of messages between devices in accordance with some embodiments.

FIG. 6A illustrates a signaling scheme between access point 502 and access point 510 for attempting to connect access point 510 to the cluster. Optionally, access point 510 may broadcast a cluster probe 605, which corresponds to a request for cluster information from any cluster master that is connected to the VLAN. Access point 502 may transmit cluster beacon 610, which may be in response to cluster probe 605 or may be transmitted independently. Cluster beacon 610 may be a broadcast message if transmitted independently of any cluster probe. Cluster beacon 610 includes the cluster identifier of the cluster and may optionally include information about the version running on the cluster, a number of access points which are cluster members, a number of dependent access points which are cluster members, a capacity of the cluster, and other information about the cluster. Upon identifying a candidate cluster to join, access point 510 transmits a cluster connection request 615 to join the cluster and may include information about the version running on access point 510. In this example, access point 510 is operating according to version 5.1. In response to the cluster connection request 615, access point 502 transmits a cluster connection response 620, which optionally includes information about the version running on the cluster.

Figure 6B:
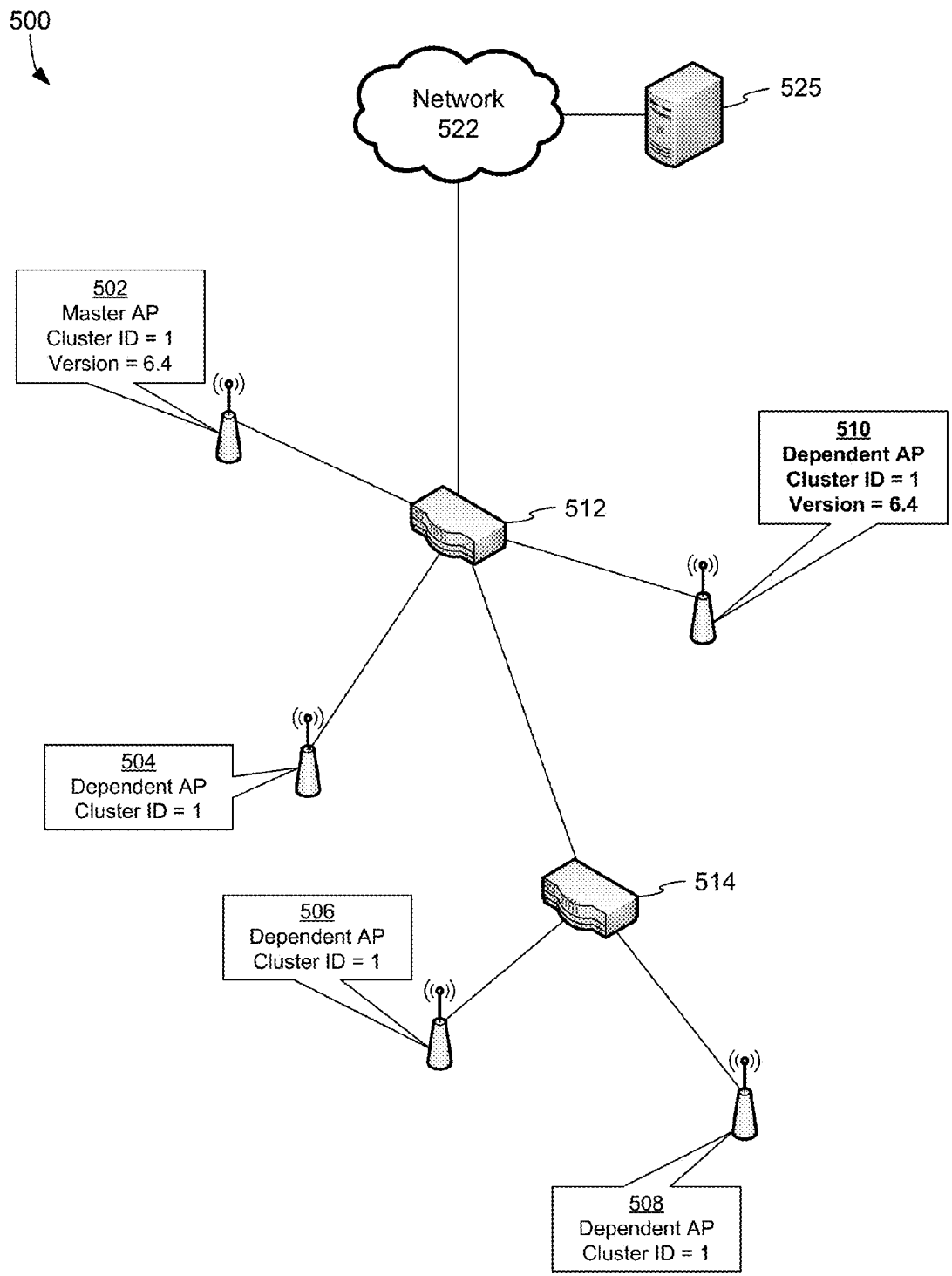
FIG. 6B illustrates a network configuration in accordance with some embodiments.

Cluster connection response 620 may include information about whether access point 510 is permitted to join the cluster, such as an authorization to join the cluster. Upon receiving an authorization to join the cluster, at 625, access point 510 joins the cluster identified by cluster ID 1. Access point 502 may transmit a cluster configuration 630, which may correspond to version 6.4. Cluster configuration 630 may include settings, firmware, software, and other information for provisioning access point 510 to join the cluster. At 635, access point 510 installs the received cluster configuration and begins operating according to version 6.4. FIG. 6B shows the resulting configuration, where access point 510 is configured as a dependent access point that has joined cluster ID 1 and operates according to version 6.4. Although, as illustrated, access point 510 has installed and is operating according to the same version as access point 502, in some embodiments, access point may join the cluster but not install the same version as access point 502, such as where access point 510 operates according to a compatible version that is not be identical to the version running on access point 502.

In some embodiments, a newly added access point may feature a newer version than may be running on an existing access point cluster. If such a newer version is not compatible with the version running on the existing access point cluster, the newly added access point may need to establish a new access point cluster. In some embodiments, a newly added access point featuring a newer version that running on an existing access point cluster may be compatible with the existing access point cluster if the existing access point cluster is upgraded to a newer version. However, in practice, upgrading an existing access point cluster may require additional configuration, which may result in network down-time, connectivity loss, or other costs associated with the upgrade. Optionally, some dependent access points within a cluster may be able to migrate from the existing access point cluster to the new access point cluster established by the newly added access point, minimizing network down-time and connectivity loss, after which time the existing master access point may be upgraded and added to the new access point cluster. Such a process may be automated to take advantage of the techniques for a cluster self-identifying which cluster to join.

Figure 7A:
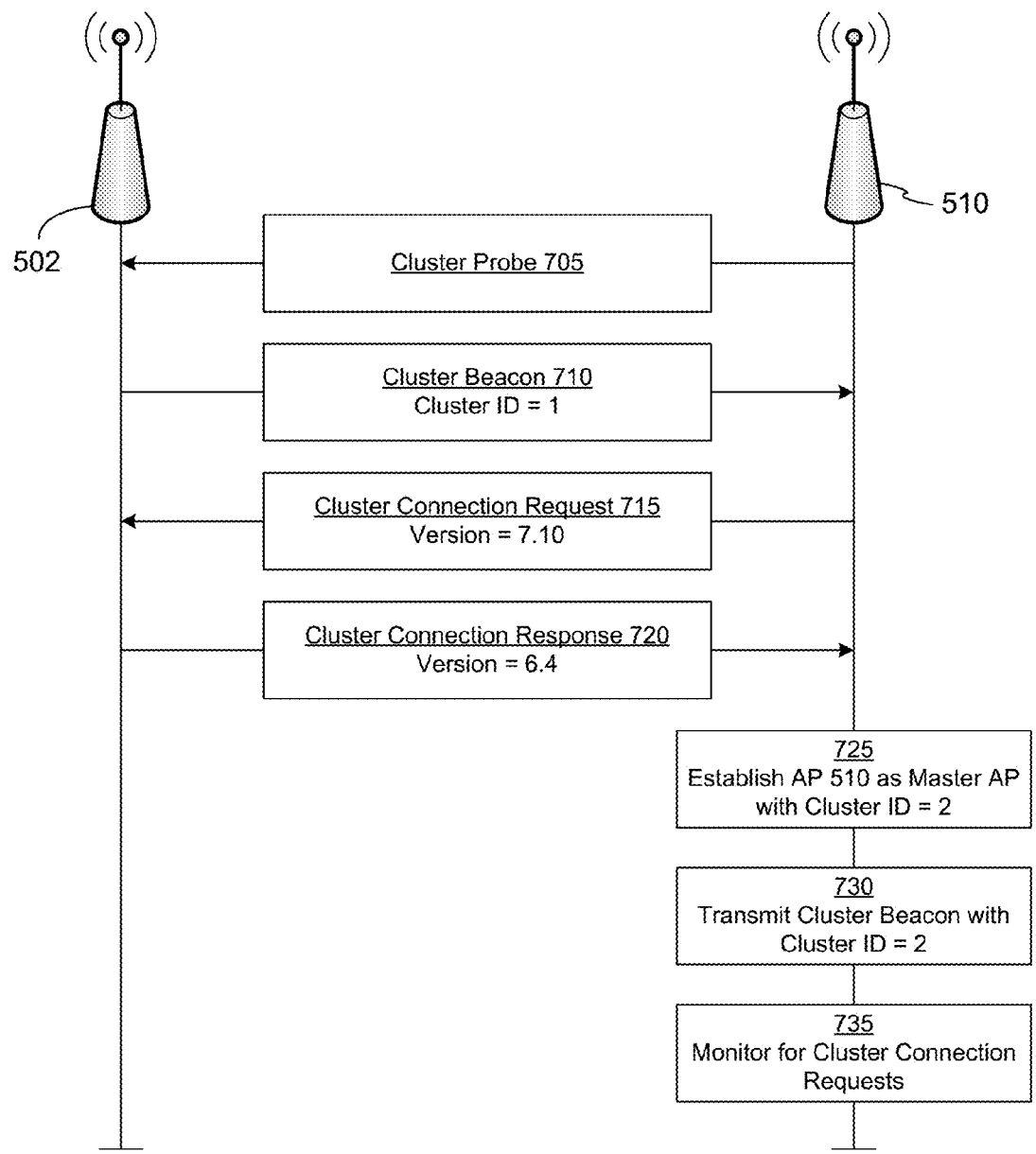
FIG. 7A illustrates an overview of the exchange of messages between devices in accordance with some embodiments.

FIG. 7A illustrates an alternative signaling scheme between access point 502 and access point 510 for attempting to connect access point 510 to the cluster. Optionally, access point 510 may broadcast a cluster probe 705, which corresponds to a request for cluster information from any cluster master that is connected to the VLAN. Access point 502 may transmit cluster beacon 710, which may be in response to cluster probe 705 or may be transmitted independently. Cluster beacon 710 may be a broadcast message if transmitted independently of any cluster probe. Cluster beacon 710 includes the cluster identifier of the cluster and may optionally include information about the version running on the cluster, a number of access points which are cluster members, a number of dependent access points which are cluster members, a capacity of the cluster, and other information about the cluster. Upon identifying a candidate cluster to join, access point 510 transmits a cluster connection request 715 to join the cluster and may include information about the version running on access point 510. In this example, access point 510 is operating according to version 7.10. In response to the cluster connection request, access point 502 transmits a cluster connection response 720, which optionally includes information about the version running on the cluster.

Figure 7B:
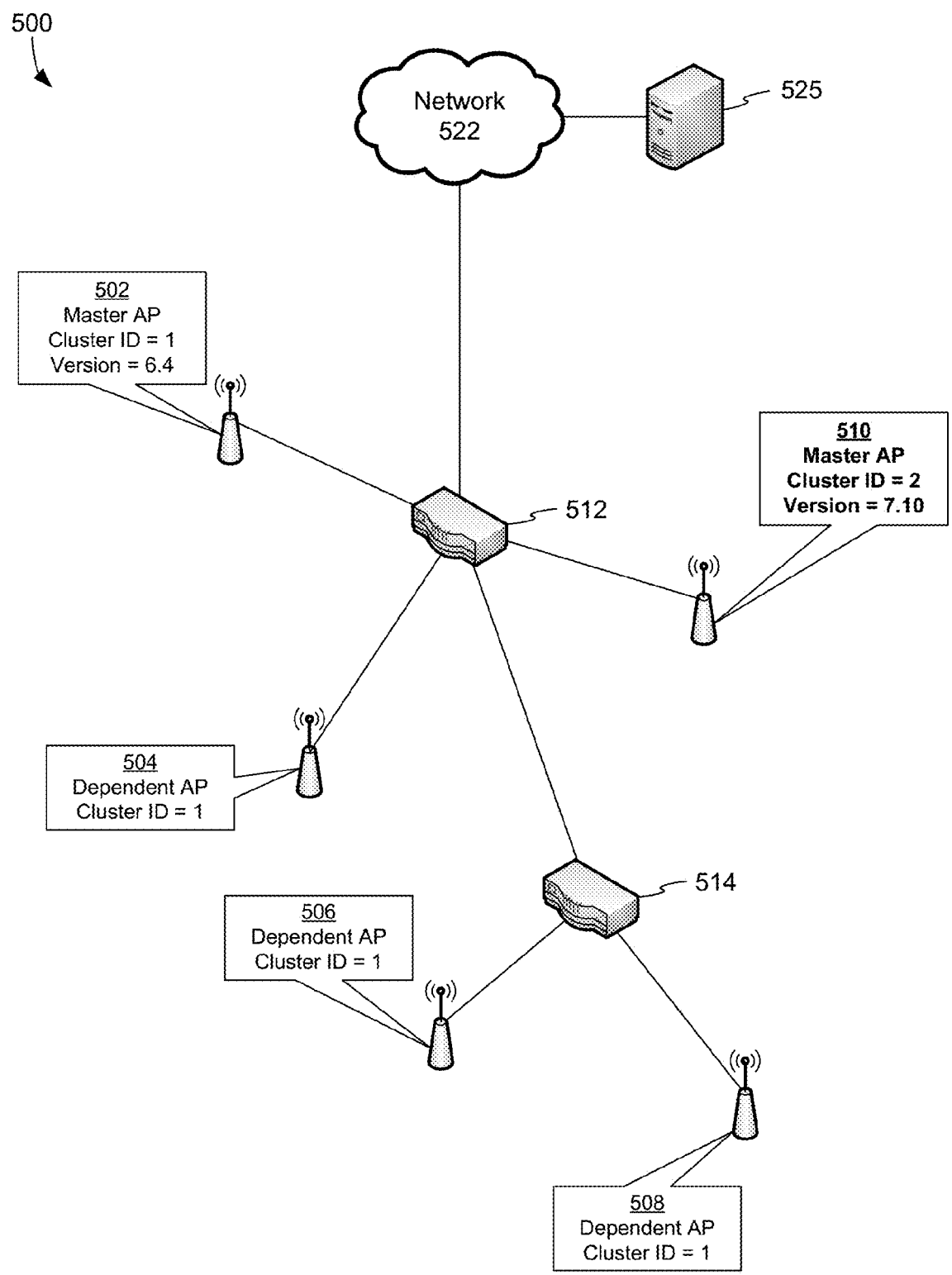
FIG. 7B illustrates a network configuration in accordance with some embodiments.

Cluster connection response 720 may include information about whether access point 510 is permitted to join the cluster, such as a rejection of the request to join the cluster. Upon determination that access point 510 is unable to join an existing cluster, at 725, access point cluster establishes itself as a new master access point with a second cluster ID, such as a cluster ID with a value of 2, as illustrated. At 730, access point 510 behaves as a cluster master and transmits a cluster beacon with the new cluster identifier. At, 735 access point 510 monitors for cluster connection request from newly added access points. FIG. 7B shows the resulting configuration, where access point 510 is configured as a master access point that has established a new cluster with cluster ID 2 and operates according to version 7.10.

Figure 8A:
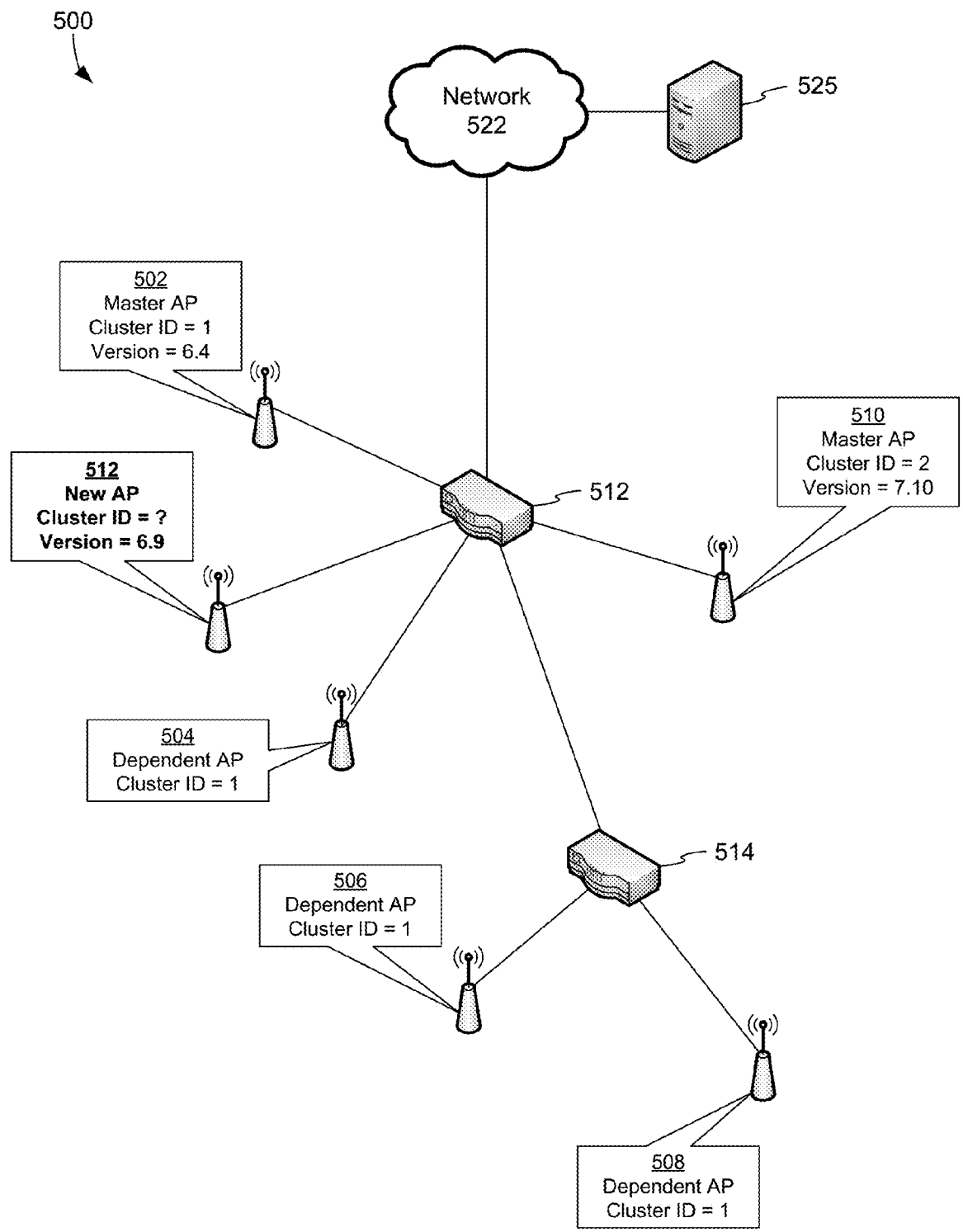
FIG. 8A illustrates a network configuration in accordance with some embodiments.

FIG. 8A illustrates an additional view of the configuration 500, where access point 510 is established as a cluster master in a cluster with cluster ID 2, and a new access point 512 is added to the VLAN. In the embodiment shown in FIG. 8, access point 512 operates on version 6.9.

Figure 8B:
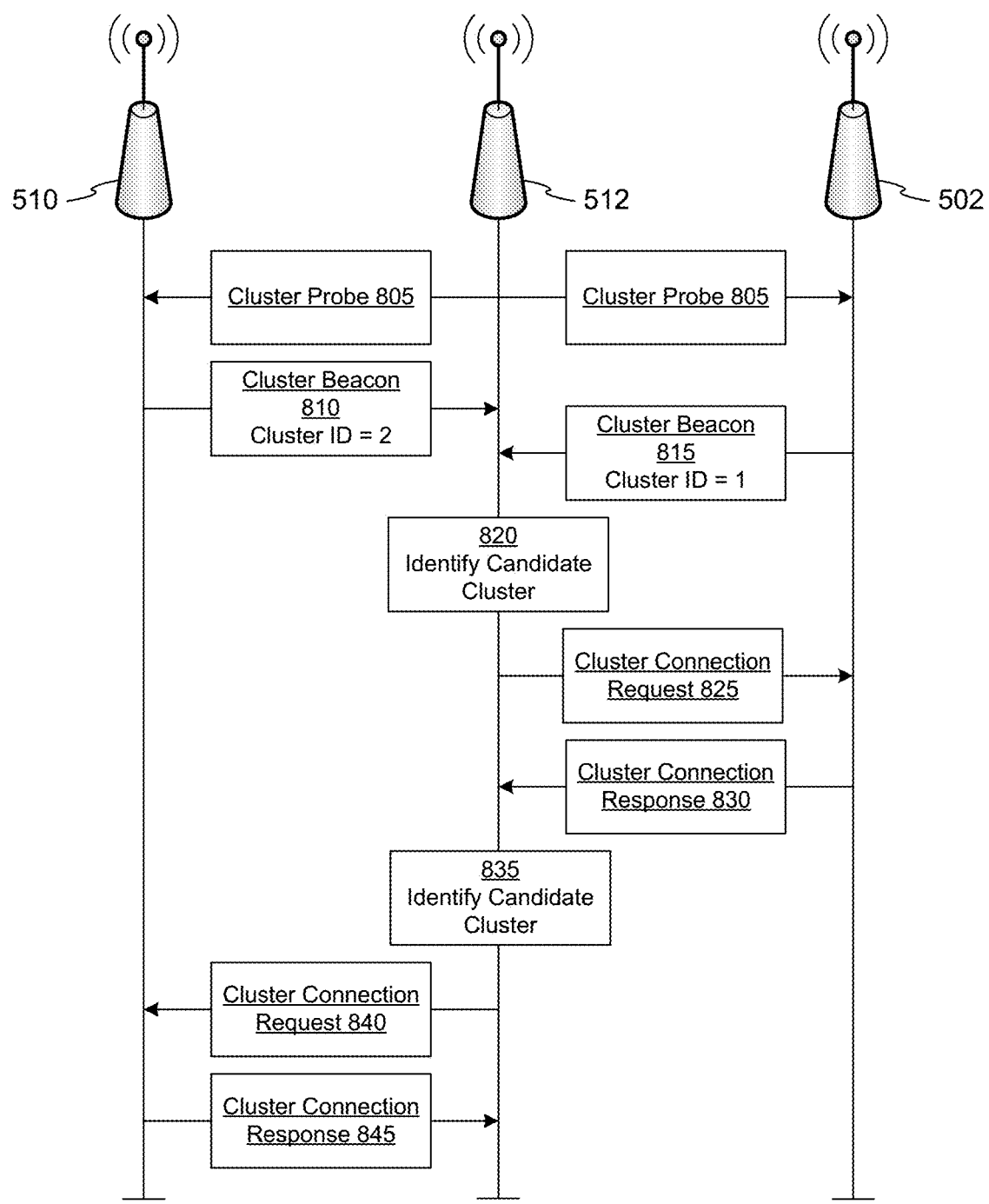
FIG. 8B illustrates an overview of the exchange of messages between devices in accordance with some embodiments.
Figure 8C:
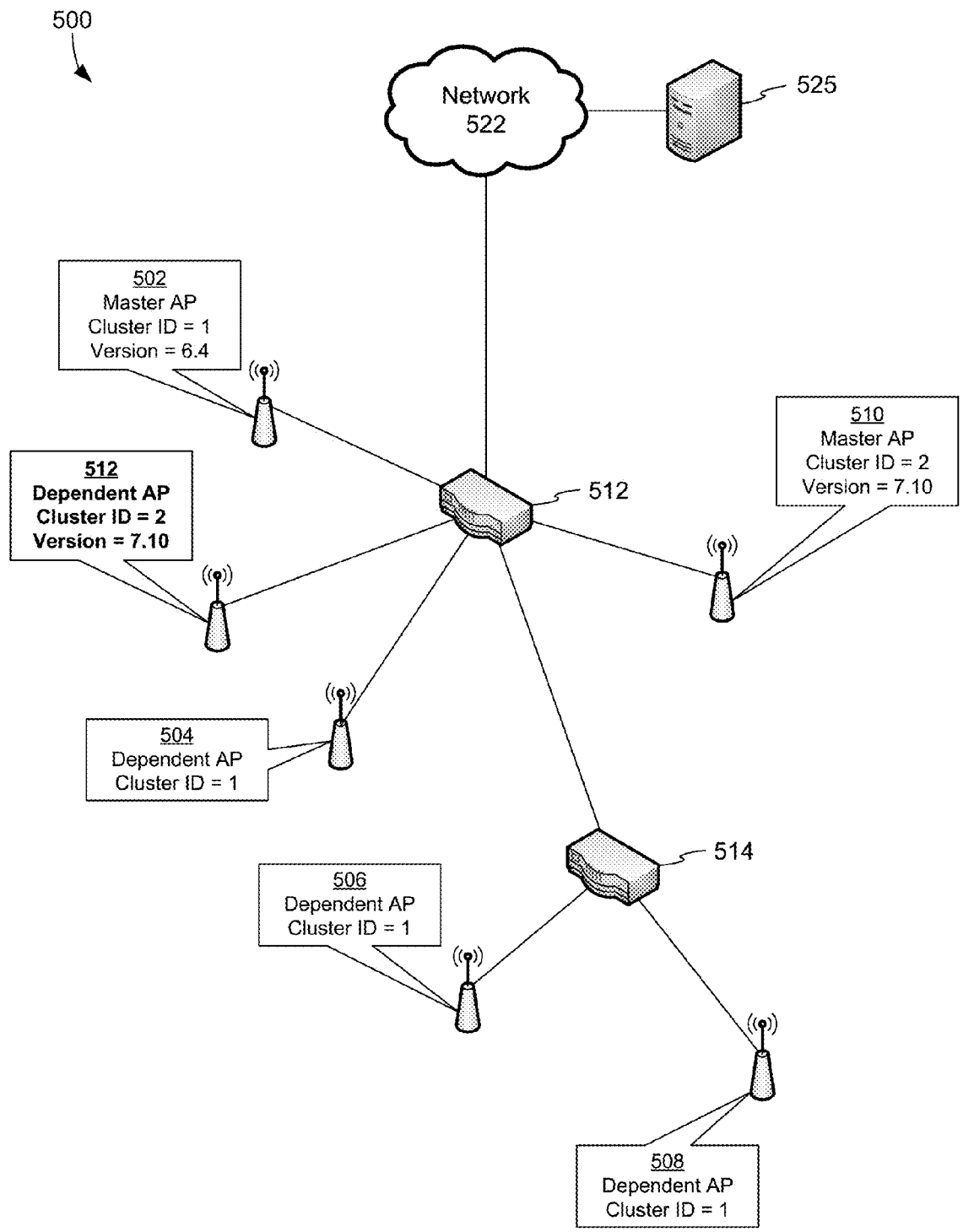
FIG. 8C illustrates a network configuration in accordance with some embodiments.

FIG. 8B illustrates a signaling scheme for self-identification of an appropriate cluster for newly added access point 512. Optionally, access point 512 transmits a cluster probe 805, which may be a broadcast message to be received by all cluster masters connected to the VLAN. In response to cluster probe 805, or independently, access point 510 transmits cluster beacon 810 and access point 510 transmits cluster beacon 815. After receiving cluster beacons 810 and 815, access point 512 identifies a candidate cluster to join, at 820. Determination of a candidate cluster may be based on one or more criteria, such as version compatibility, cluster capacity, cluster size, cluster master capabilities, cluster master hardware configuration, network latency to the cluster master, etc. In the embodiment shown, access point 512 identifies the cluster having cluster ID 1 as the candidate cluster and transmits a cluster connection request 825. In response access point 502 transmits cluster connection response 830, which may include a rejection of the request to join the cluster having cluster ID 1.

Although the embodiment illustrated shows an explicit request and response, in some embodiments, the identification of the candidate cluster for access point 512 to join may include an evaluation of version compatibility and cluster capacity and result in a determination to not attempt to join the access point cluster corresponding to cluster ID 1, such as if versions are not compatible or if capacity is not available. In the embodiment illustrated, access point 502 may evaluate version compatibility and cluster capacity for determining whether access point 512 is permitted to join the cluster with cluster ID 1.

At 835, access point 512 may identify a new candidate cluster to join, given that the previous attempt to join the cluster with cluster ID 1 was unsuccessful. Access point 512 transmits cluster connection request 840, and access point 510 transmits cluster connection response 845.

For example, connection request 840 may include permission or authorization for access point 512 to join the cluster having cluster ID 2. Further, although access point 512 was illustrated as running version 6.9 when added to the VLAN, this version may be compatible or upgradable to another version, such as the version 7.1 running by access point 510. In one embodiment, upon joining the cluster having cluster ID 2, a configuration is transmitted by access point 510, received by access point 512, and installed by access point 512, resulting in the configuration illustrated in FIG. 8C, where access point 512 is configured as a dependent access point in the cluster with cluster ID 2 and upgraded to version 7.10.

Figure 9A:
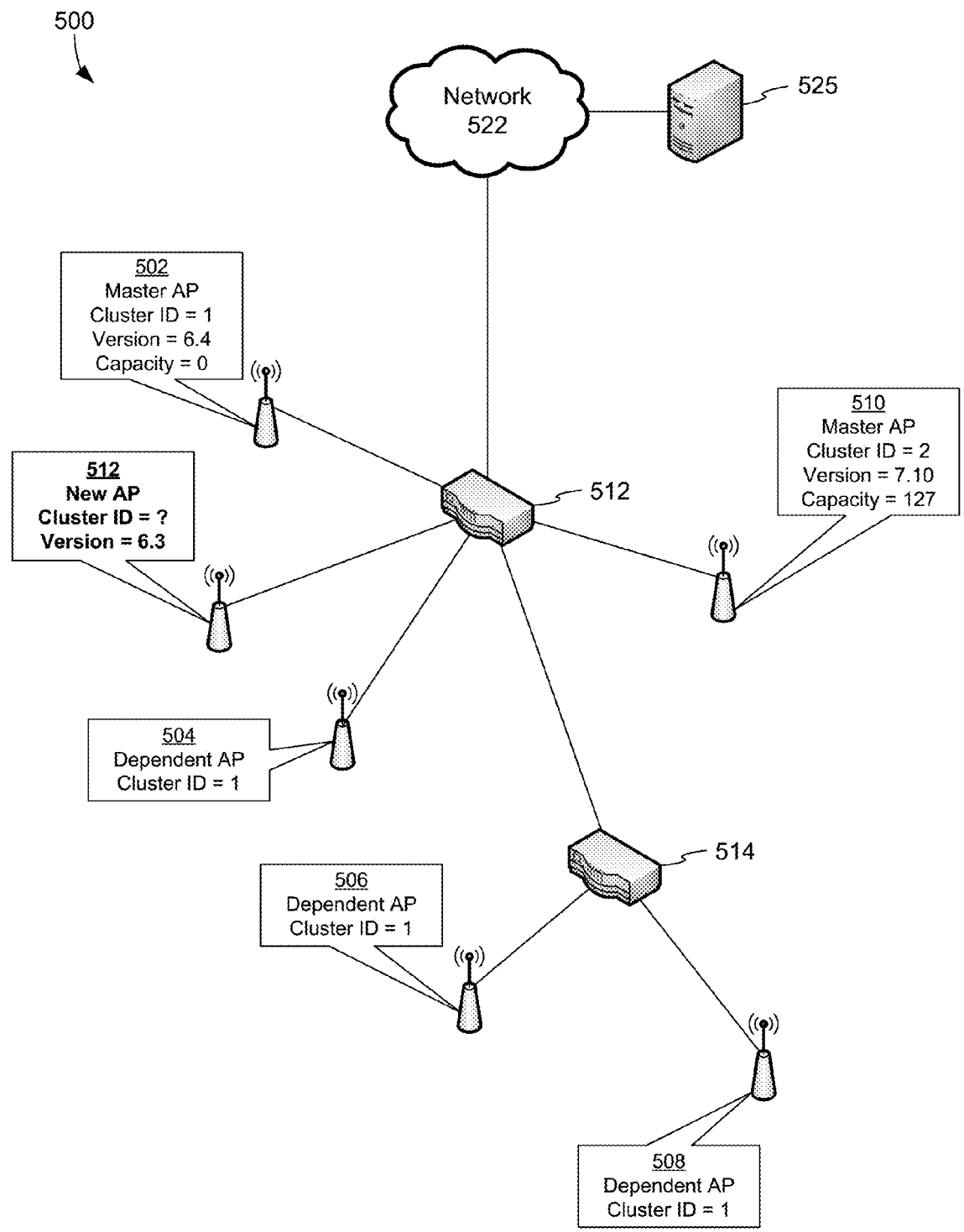
FIG. 9A illustrates a network configuration in accordance with some embodiments.
Figure 9B:
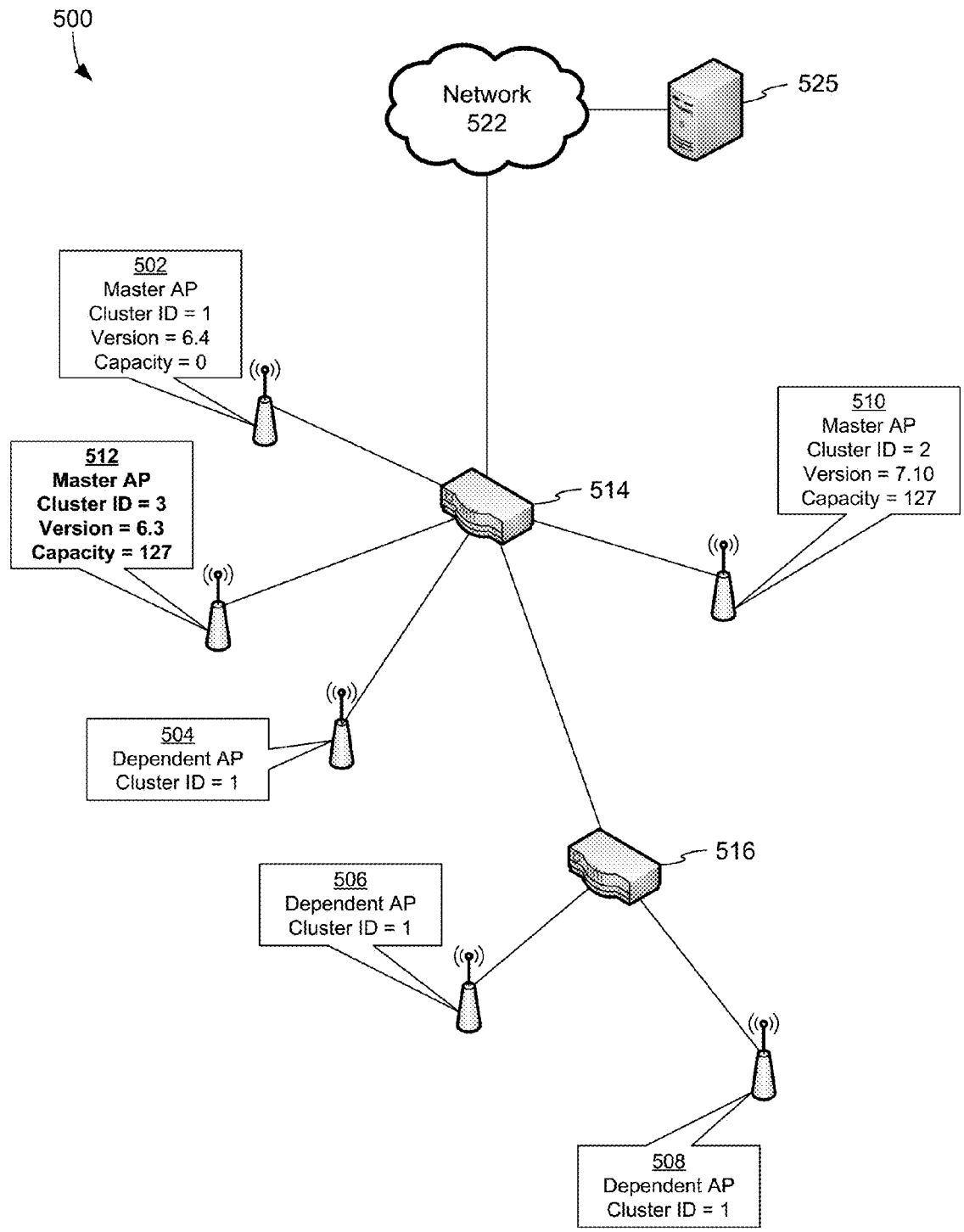
FIG. 9B illustrates a network configuration in accordance with some embodiments.

Another example is illustrated in FIGS. 9A and 9B. In this example, the newly added access point 512 is running a version, such as version 6.3, that is incompatible with access point 510, but that is compatible with access point 502. However, access point 502 does not have capacity for additional dependent access points. In this case, access point 512 may have received a rejection for a request to join both access point clusters with cluster ID 1 and cluster ID 2 or may not have attempted to join either access point cluster, such as if capacity or version information were available to access point 512 upon connecting to the VLAN. With no access point clusters available for access point 512 to join, access point 512 may establish itself as a new cluster master for a new cluster designated by cluster ID 3, as illustrated in FIG. 9B.

Figure 10:
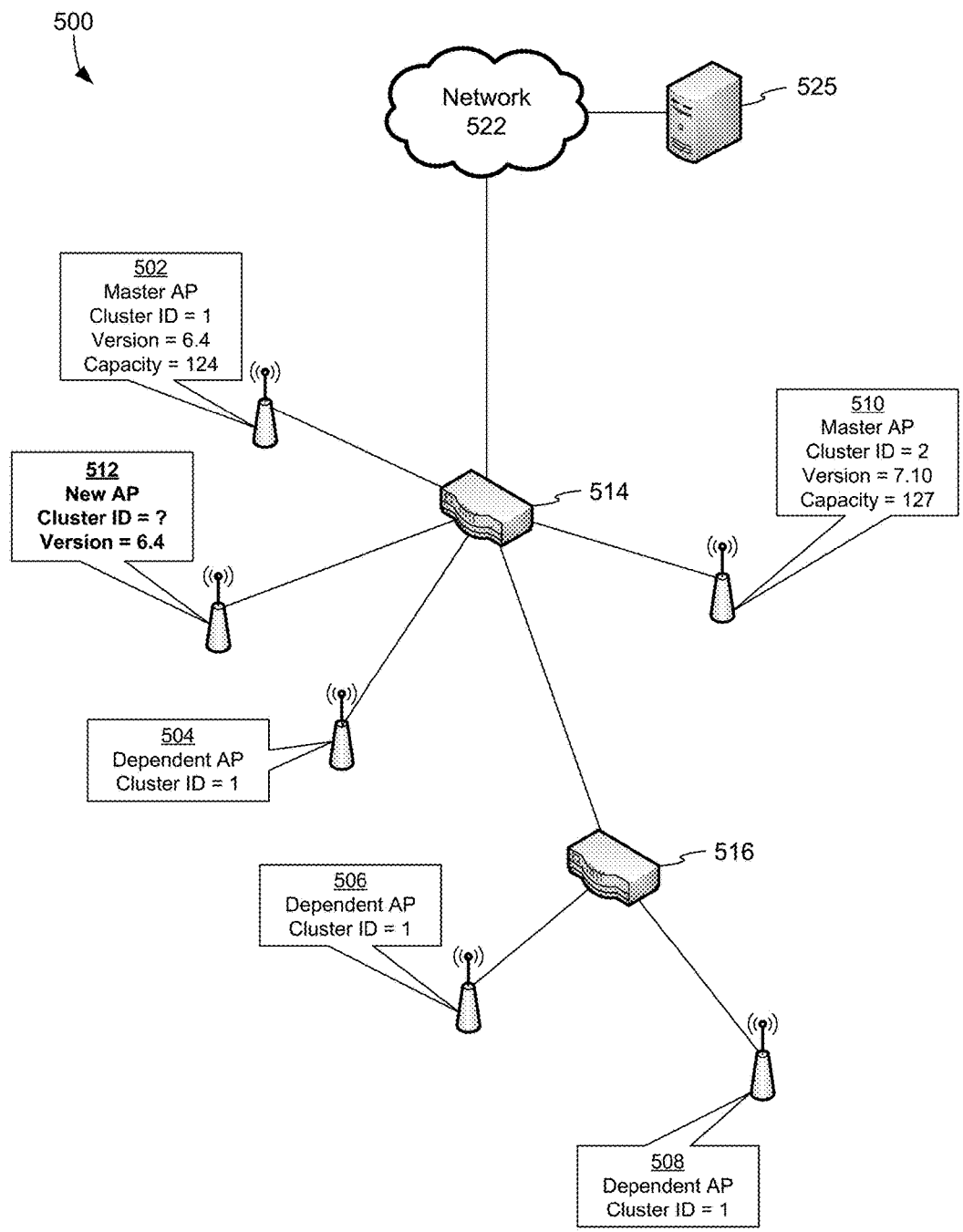
FIG. 10 illustrates a network configuration in accordance with some embodiments.

Another example is illustrated in FIG. 10. In this example, the newly added access point 512 is running a version, such as version 6.4, that is compatible with or upgradeable to versions running on both access point 510 and access point 502. In addition, both access point 510 and access point 502 indicate capacity for the new access point 512 to join the corresponding clusters. In this case the new access point 512 may join either the cluster corresponding to cluster ID 1 or the cluster corresponding to cluster ID 2.

Access point 512 may use one or more criteria for determining which access point cluster to join. For example, access point 512 may determine to join the cluster having the most capacity. As another example, access point 512 may determine to join the cluster having the least capacity. Access point 512 may, for example, determine to join the cluster having the most number of dependent access points. As another example, access point 512 may determine to join the cluster having the least number of dependent access points. Access point 512 may, for example, determine to join the cluster having the lowest network latency to the cluster master access point. As another example, access point 512 may determine to join the cluster having the most recent version. Access point 512 may, for example, determine to join the cluster having the most similar hardware configuration as access point 512. As another example, access point 512 may determine to join the cluster in which the master access point has the most processing power, memory, or other hardware characteristics. Access point 512 may, for example, determine to join the cluster in which the master access point has the lowest network latency to server 525. As another example, if access point location and/or network configuration information is available to access point 512, access point 512 may determine to join the cluster where the master access point is physically closest to/furthest from access point 512, where the master access point is connected to a same/different network switch as access point 512, where the master access point is located at a same/different location/floor/site as access point 512, etc. Access point 512 may, for example, determine to join the cluster having the most similar hardware configuration as access point 512. As one skilled in the art will understand, the determination of which access point cluster to join may depend on more than one criteria and in such a circumstance, may be decided based on weighted averages, a decision tree or similar mechanism to evaluate among the more than one criteria.

Additionally, all or some of the criteria that access point 512 can use to make a decision may be available to the master access points 502 and 510. Having this criteria information available, master access point 502 and 510 can determine whether to reject or accept a request from access point 512 to join the respective clusters. In this way, the decision for which cluster access point 512 should join can occur at the cluster master access points 510 and/or 502. For example, if one of master access points 510 or 502 is configured as a super master access point for a super cluster including clusters with cluster ID 1 and cluster ID 2, the super master access point can direct a new access point to a particular one of the clusters.

The examples described above illustrate how a newly added access point incorporating the presently described technologies can evaluate whether access points clusters are connected to a VLAN and attempt to join the access point clusters. The newly added access points can optionally self-evaluate version compatibility, capacity, and/or other criteria to identify candidate clusters to join. Optionally, master access points in existing clusters can evaluate version compatibility, capacity and/or other criteria to determine whether to authorize the newly added cluster to join the existing clusters. If no existing clusters are suitable or available for the newly added access point to join, it may establish a new cluster, designated by a new cluster identifier which can distinguish the new cluster from other existing clusters. Optionally, the newly added access point, operating as a new cluster master, can evaluate additional requests from additional newly added access points to join the new cluster.

Figure 11:
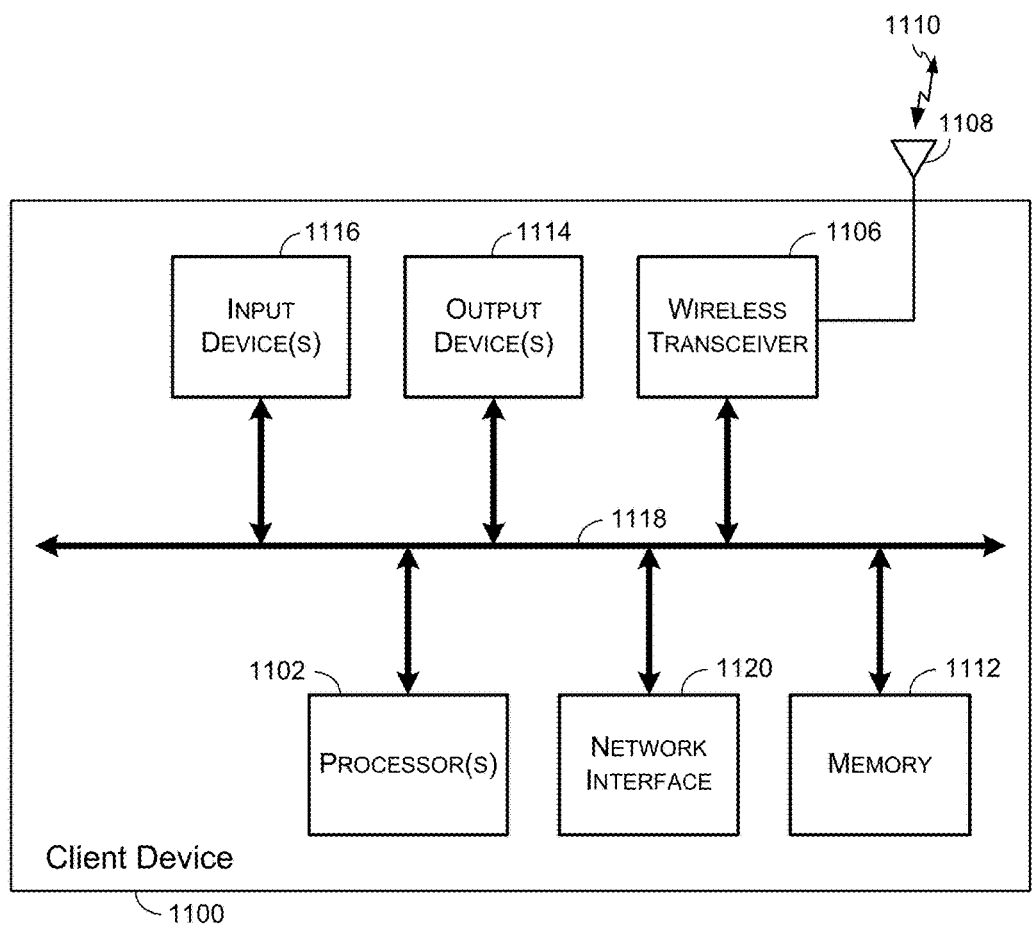
FIG. 11 is a block diagram illustrating an example of a wireless client device in accordance with some embodiments.

FIG. 11 illustrates an example of a client device 1100, such as a wireless client device that can connect to a wireless network, for example by association with an access point. Client devices may also referred to herein as wireless devices, stations, network devices and the like. The client device 1100 includes hardware elements that can be electrically coupled via a bus 1118 (or may otherwise be in communication, as appropriate). In one embodiment, the bus 1118 can be used for the processor(s) 1102 to communicate between cores and/or with the memory 1112. The hardware elements may include one or more processors 1102, including without limitation one or more general-purpose processors and/or one or more special-purpose processors (such as digital signal processing chips, graphics acceleration processors, and/or the like); one or more input devices 1116; one or more output devices 1114; and one or more wireless transceivers 1106. Optionally, input device 1116 can include numerous devices including, without limitation, a camera, a mouse, a keyboard, a touch sensitive screen, a touch pad, a keypad, and/or the like. Optionally, output device 1114 can include numerous devices including, but not limited to, a display, a printer and/or the like. Client devices optionally include one or more network interfaces 1120, such as for network communications over a wired medium, such as a twisted pair cable, a coaxial cable, a fiber optic cable or other network communication cable. For example, network interface 1120 may provide for a wired network connection to an IEEE 802.3 compliant Ethernet network.

The client device 1100 includes one or more wireless transceivers 1106 connected to the bus 1118. The wireless transceiver 1106 may be operable to transmit and/or receive wireless signals (e.g., signal 1110) via one or more antennas 1108. A wireless signal 1110 received by client device 1100 may be transmitted via a wireless device compliant with a wireless communications standard that the client device 1100 supports. A wireless signal 1110 transmitted by client device 1100 may be a wireless signal compliant with a wireless communications standard that the client device 1100 supports. For example, embodiments are contemplated where the wireless communications standard is one or more of IEEE 802.11, Bluetooth, Zigbee, UWB, wireless USB, Z-Wave and the like. In an exemplary embodiment, the wireless communications standard is an IEEE 802.11 standard, such as 802.11n or 802.11 ac. Wireless transceiver 1106 may be configured to transmit and/or receive various radio frequency (RF) signals (e.g., signal 1110) via antenna 1108 from one or gateways, network devices, access points, other client devices, cellular networks, and/or the like. Client device 1100 may also be configured to decode and/or decrypt various signals received.

The client device 1100 may further include (and/or be in communication with) one or more non-transitory machine-readable storage mediums or storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1112, such as RAM, ROM, FLASH, or disc drive, and executed by processor(s) 1102. The client device 1100 can also comprise software elements or functions (e.g., located within the memory 1112), including, for example, an operating system, device drivers, executable libraries, and/or other code, such as one or more application programs, which may comprise computer programs implementing various functions. Memory 1112 may be a non-transitory machine-readable storage medium, processor-readable memory, and/or a computer-readable memory that stores the one or more computer-program products configured to cause the processor(s) 1102 to perform various functions. In other embodiments, various functions described may be performed in hardware.

Figure 12:
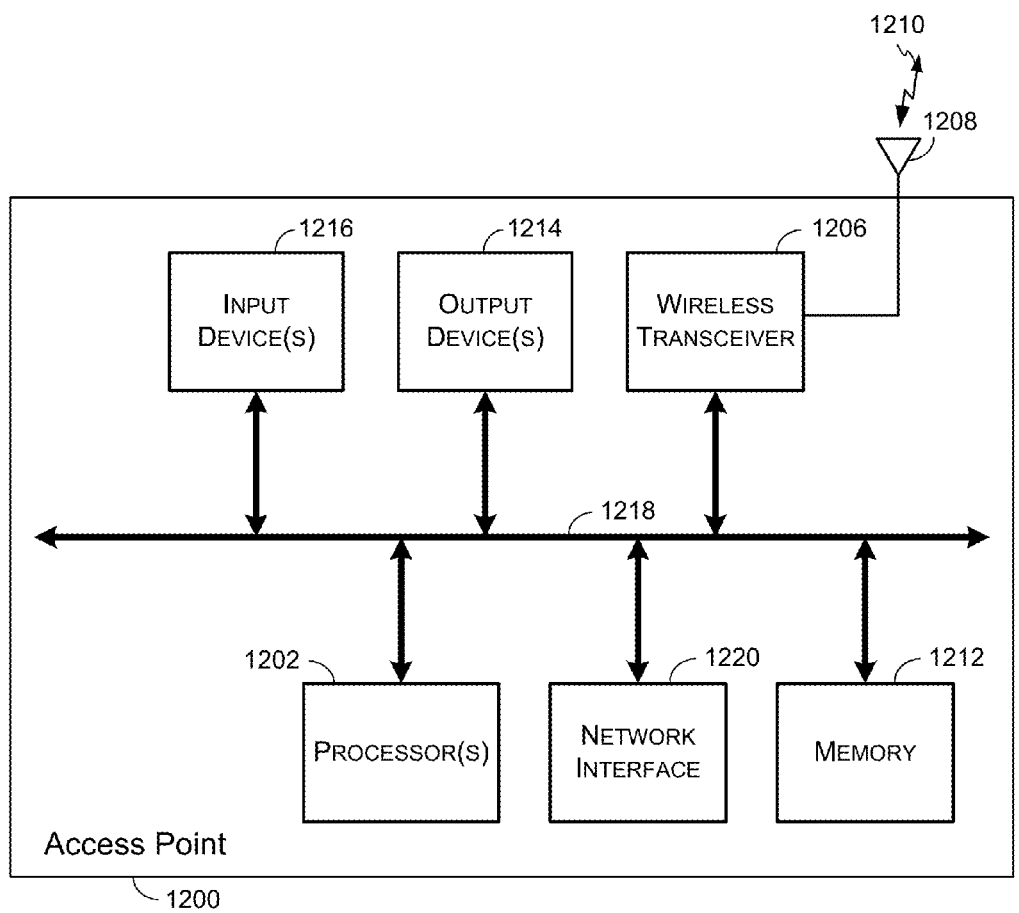
FIG. 12 is a block diagram illustrating an example of an access point in accordance with some embodiments.

FIG. 12 illustrates an example of an access point 1200. The access point 1200 may optionally include or otherwise function as a range extending device, a router, a gateway, a modem, and/or any other device that provides network access among one or more computing devices and/or networks. For example, access point 1200 may include a router gateway with access point and router functionality, and may further include an Ethernet switch and/or a modem. As another example, the access point 1200 may include a range extender that may be used to improve signal range and strength within a wireless network by taking an existing signal from another access point and rebroadcasting the signal to create an expanded logical network. Optionally, access point 1200 may include or otherwise function as a network controller for configuring and/or managing itself and/or other access points.

The access point 1200 includes hardware elements that can be electrically coupled via a bus 1218 (or may otherwise be in communication, as appropriate). In one embodiment, the bus 1218 can be used for the processor(s) 1202 to communicate between cores and/or with the memory 1212. The hardware elements may include one or more processors 1202, including without limitation one or more general-purpose processors and/or one or more special-purpose processors (such as digital signal processing chips, graphics acceleration processors, and/or the like); one or more input devices 1216, which can include without limitation one or more buttons, a keyboard, a keypad, a touch sensitive screen, a touch pad, and/or the like; and one or more output devices 1214, which can include, without limitation, a display, light or sound indicators, and/or the like.

The access point 1200 may include one or more wireless transceivers 1206 connected to the bus 1218. The wireless transceiver 1206 may be operable to receive and transmit wireless signals (e.g., a wireless signal 1210) via an antenna 1208. The wireless transceiver 1206 may include a transceiver radio designed to transmit and receive signals in compliance with a wireless communications standard. Exemplary wireless communications standards include, but are not limited to, IEEE 802.11 (also referred to herein as WiFi or Wi-Fi), Bluetooth, Zigbee, UWB, wireless USB and Z-Wave. In various embodiments, a wireless communications standard specifies frequency bands, channels, data packet characteristics and other transmission characteristics necessary for inter device-communication. For example, wireless transceiver 1206 may include a 2.4 GHz WiFi circuit or a 5 GHz WiFi circuit. Accordingly, the access point 1200 may include a single WiFi circuit for a WiFi communications, and a single Bluetooth circuit for Bluetooth communications. In some embodiments, the access point 1200 may include multiple wireless transceivers (not shown) for each available communications standard. The antenna 1208 may include multiple band antennas that can transmit and/or receive signals over different frequency bands.

The access point 1200 may further include a radio frequency (RF) circuit. In some embodiments, the wireless transceiver 1206 may be integrated with or coupled to the RF circuit so that the RF circuit includes the wireless transceiver 1206. In some embodiments, the wireless transceiver 1206 and the RF circuit are separate components. The RF circuit may include a RF amplifier that may amplify signals received over antenna 1208. The RF circuit may also include a power controller that may be used to adjust signal amplification by the RF amplifier. The power controller may be implemented using hardware, firmware, software, or any combination thereof.

The wireless signal 1210 may be transmitted via a wireless communication channel. In some embodiments, the wireless communication channel may be any wireless communication channel established between two or more devices, such as a wireless local area network (e.g., a WiFi network), a Personal Access Network (e.g., between Bluetooth, Zigbee, UWB or wireless USB compatible devices), or a cellular network (e.g., a GSM, WCDMA, LTE, CDMA2000 network). The wireless transceiver 1206 may be configured to receive various radio frequency (RF) signals (e.g., signal 1210) via antenna 1208, respectively, from one or more other access points, network devices, beacons and/or the like. Access point 1200 may also be configured to decode and/or decrypt various signals received from one or more access points, network devices, wireless client devices, and/or the like.

The access point 1200 may include a power supply (not shown) that can power the various components. The power supply may include a switched-mode power supply, a linear power supply, a push-pull power supply, or any other suitable type of power supply. In some embodiments, the access point 1200 may include multiple power supplies. For example, a switched-mode power supply may be used to condition input power, and a linear power supply may be used to power the RF circuit. The power supply may be configured to operate over various ranges of appropriate input voltages.

Alternatively, the access point 1200 may include circuitry for receiving voltage, current or power via an external power supply or a Power over Ethernet connection. Power over Ethernet support is optionally provided by network interface 1220. Network interface 1220 can provide for network connections to external devices via any standardized or specialized network connection, such as IEEE 802.3. In an exemplary embodiment, network interface 1220 provides support for a wired Ethernet connection to a network. Other wired network technologies are contemplated for connection to networks, as will be understood by the skilled artisan; however, due to its ubiquitous nature and support for Power over Ethernet, wired Ethernet over twisted pairs may be preferentially employed.

The access point 1200 may further include (and/or be in communication with) one or more non-transitory machine-readable storage mediums or storage devices (e.g., memory 1212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1212, such as RAM, ROM, FLASH, or disc drive, and executed by processor(s) 1202. The access point 1200 can also comprise software elements (e.g., located within the memory 1212), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 13:
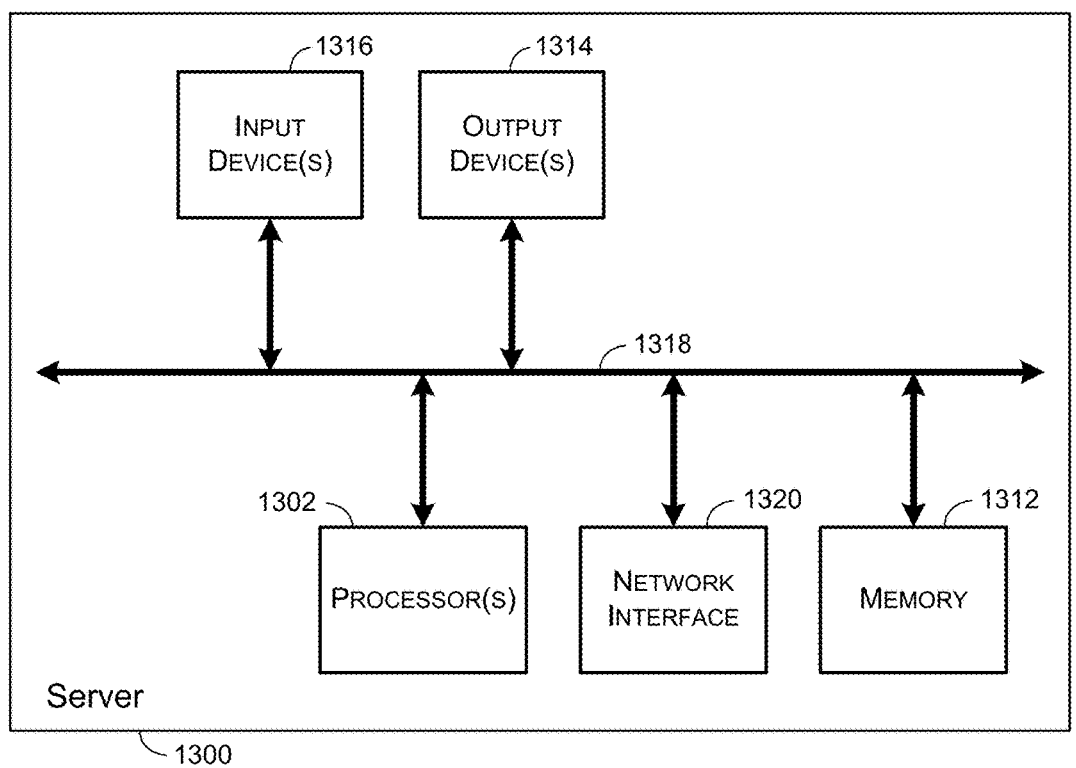
FIG. 13 is a block diagram illustrating an example of a server in accordance with some embodiments.

FIG. 13 illustrates an example of a server 1300. In various embodiments, server 1300 may communicate with other devices such as using one or more wireless or wired data networks. Server 1300 may provide network services and/or may be used to control and/or manage one or more wireless devices, such as one or more wireless access points. The server 1300 includes hardware elements that can be electrically coupled via a bus 1318 (or may otherwise be in communication, as appropriate). In one embodiment, the bus 1318 can be used for the processor(s) 1302 to communicate between cores and/or with the memory 1312. The hardware elements may include one or more processors 1302, including without limitation one or more general-purpose processors and/or one or more special-purpose processors (such as digital signal processing chips, graphics acceleration processors, and/or the like), memory 1312, output devices 1314, input devices 1316, a bus 1318 and a network interface 1320. Furthermore, in addition to the network interface 1320, server 1300 can optionally further include a wireless transceiver to communicate with a network (e.g., a wireless local area network, a wireless network of a preferred carrier, Internet, etc.).

The server 1300 may further include (and/or be in communication with) one or more non-transitory machine-readable storage mediums or storage devices (e.g., memory 1312), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1312. The server 1300 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the aspects of methods described herein, such as centralized management and control over wireless access points, beacons, etc. The memory 1312 may be a non-transitory machine-readable storage medium, processor-readable memory, and/or a computer-readable memory that stores the one or more computer-program products configured to cause the processor(s) 1302 to perform the functions described. In other embodiments, one or more of the functions described may be performed in hardware.

A set of these instructions and/or code is optionally stored on a non-transitory machine-readable storage medium, such as the memory 1312. In some cases, the storage medium is optionally incorporated within a computer system. In other embodiments, the storage medium is optionally separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1300 and/or may take the form of source and/or installable code, which, upon compilation and/or installation on the server 1300 (e.g., using any of a variety of generally available compilers, installation programs, compression/decompression utilities, etc.) then takes the form of executable code.

Merely by way of example, one or more procedures described with respect to the processes or methods discussed above, for example as described with respect to FIGS. 6A, 7A, and 8B or any portion thereof, may be implemented as code and/or instructions executable by a computer or device (and/or a processor within a computer or device); in an aspect, then, such code and/or instructions can be used to configure and/or adapt a general purpose computer (or other device) to perform one or more operations in accordance with the described methods. Such functions or code may include code to perform the steps described above with respect to FIGS. 6A, 7A, and 8B or portions thereof. The memory may be a non-transitory machine-readable storage medium, processor-readable memory, and/or a computer-readable memory that stores the one or more computer-program products configured to cause the processor(s) to perform the functions described. In other embodiments, one or more of the functions described may be performed in hardware.

Aspects of the disclosed methods, when performed by a general purpose computer, allow the general purpose computer to perform more efficiently, such as by performing an operation in fewer steps or using less memory or processing time, than prior methods. Further, performance of aspects of the disclosed methods by a general purpose computer may transform the general purpose computer into a special purpose computer, such as a network device, a wireless access point, a wireless client, etc. Aspects of the disclosed methods, when performed by a general purpose computer, further allow the general purpose computer to perform new functions and/or to perform functions in new ways, such as in more useful orders. For example, aspects of the disclosed methods achieve simplified and/or more efficient operation of network devices, such as client devices and wireless access point, as well as efficiency gains in operation of wireless networking and use of the radio frequency medium.

A set of these instructions and/or code might be stored on a non-transitory machine-readable storage medium, such as the memory. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by a computer or device and/or might take the form of source and/or installable code, which, upon compilation and/or installation on the computer or device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A non-transitory machine-readable medium storing instructions executable by a processor to:
   establish, by an access point, a connection with a virtual local area network (VLAN) using the network transceiver;
   receive a cluster identifier, wherein the cluster identifier is associated with a candidate access point cluster (AP cluster), wherein the cluster identifier distinguishes the candidate AP cluster from another AP cluster connected to the VLAN, and wherein the cluster identifiers facilitates multiple AP clusters operating on the VLAN;
   transmit a cluster connection request, wherein the cluster connection request includes a request for joining the candidate AP cluster;
   receive a cluster connection response, wherein the cluster connection response is associated with the candidate AP cluster;
   generate a new cluster identifier; and
   establish a new AP cluster based on the cluster connection response indicating that the request for joining the candidate AP cluster is rejected and the new cluster identifier.

2. The non-transitory machine-readable medium of claim 1, wherein receiving the cluster identifier includes receiving a cluster beacon message, and wherein the cluster beacon message corresponds to a message broadcast by a master access point associated with the candidate cluster.

3. The non-transitory machine-readable medium of claim 1, wherein receiving a cluster identifier includes receiving a plurality of cluster beacon messages, and wherein each cluster beacon message includes a cluster identifier distinguishing an AP cluster associated with the cluster identifier from another AP cluster connected to the VLAN.

4. The non-transitory machine-readable medium of claim 1, wherein the instructions are executable by the processor to:
   receive a cluster version, wherein the cluster version is associated with the candidate AP cluster; and
   compare the cluster version with a version for the access point.

5. The non-transitory machine-readable medium of claim 4, wherein the instructions are executable by the processor to determine that the access point is compatible with the cluster version.

6. The non-transitory machine-readable medium of claim 4, wherein the instructions are executable by the processor to determine that the access point is compatible with the cluster version, wherein the cluster connection response includes authorization to join the candidate AP cluster.

7. The non-transitory machine-readable medium of claim 4, wherein the instructions are executable by the processor to determine that the access point is incompatible with the cluster version.

8. The non-transitory machine-readable medium of claim 4, wherein the instructions are executable by the processor to determine that the access point is incompatible with the cluster version, wherein the cluster connection response includes a rejection of the request to join the candidate AP cluster.

9. The non-transitory machine-readable medium of claim 1, wherein the cluster connection request includes a version for the access point, and wherein the cluster connection request facilitates a master access point determining compatibility of the version with a cluster version of an AP cluster associated with the master access point.

10. The non-transitory machine-readable medium of claim 1, wherein the instructions are executable by the processor to:
    receive a cluster size, wherein the cluster size is associated with the candidate AP cluster; and
    determine that the candidate AP cluster has sufficient capacity for the access point to join the candidate cluster, wherein determining includes comparing the cluster size with a maximum cluster size.

11. The non-transitory machine-readable medium of claim 1, wherein the instructions are executable by the processor to:
    receive a cluster size, wherein the cluster size is associated with an additional candidate AP cluster; and
    determine that the additional candidate AP cluster has insufficient capacity for the access point to join the additional AP candidate cluster, wherein determining includes comparing the cluster size with a maximum cluster size.

12. The non-transitory machine-readable medium of claim 1, wherein the cluster connection request facilitates a master access point determining whether an AP cluster associated with the master access point has sufficient capacity for the access point to join the AP cluster.

13. The non-transitory machine-readable medium of claim 1, wherein the cluster connection response includes authorization to join the candidate AP cluster.

14. The non-transitory machine-readable medium of claim 1, wherein the instructions are executable by the processor to join the candidate AP cluster.

15. The non-transitory machine-readable medium of claim 1, wherein the instructions to join the candidate AP cluster include instructions to establish the access point as a new slave access point associated with the candidate AP cluster.

16. The non-transitory machine-readable medium of claim 1, wherein the instructions to join the candidate AP cluster include instructions to receive a configuration associated with the candidate AP cluster and installing the configuration.

17. The non-transitory machine-readable medium of claim 1, wherein the cluster connection response includes a rejection of the request to join the candidate AP cluster, and wherein the instructions are executable by the processor to:
    receive an additional cluster identifier, wherein the additional cluster identifier is associated with an additional candidate AP cluster, and wherein the additional cluster identifier distinguishes the additional candidate AP cluster from the candidate AP cluster and other AP clusters present on the VLAN;
transmit an additional connection request, wherein the additional connection request includes a request for joining the additional candidate AP cluster;
receive an additional connection response, wherein the additional connection response is associated with the additional candidate AP cluster; and
join the additional candidate AP cluster.

18. The non-transitory machine-readable medium of claim 1, wherein the cluster connection response includes an additional cluster identifier, wherein the additional cluster identifier is associated with an additional candidate AP cluster, and wherein instructions are executable by the processor to:
transmit an additional connection request, wherein the additional connection request includes a request for joining the additional candidate AP cluster;
receive an additional connection response, wherein the additional connection response is associated with the additional candidate AP cluster; and
join the additional candidate AP cluster.

19. A computer implemented method, comprising:
establishing, by an access point, a connection with a virtual local area network (VLAN); receiving a cluster identifier, wherein the cluster identifier is associated with a candidate access point cluster (AP cluster), wherein the cluster identifier distinguishes the candidate AP cluster from another AP cluster connected to the VLAN, and wherein the cluster identifiers facilitates multiple AP clusters operating on the VLAN;
transmitting a cluster connection request, wherein the cluster connection request includes a request for joining the candidate AP cluster;
receiving a cluster connection response, wherein the cluster connection response is associated with the candidate AP cluster;
generating a new cluster identifier; and
establishing a new AP cluster based on the cluster connection response indicating that the request for joining the candidate AP cluster is rejected and the new cluster identifier.

20. A non-transitory computer readable medium comprising instructions that, when executed by one or more processors, cause the one or more processors to perform operations including:
establishing, by an access point, a connection with a virtual local area network (VLAN) using a network transceiver;
receiving a cluster identifier, wherein the cluster identifier is associated with a candidate access point cluster (AP cluster), wherein the cluster identifier distinguishes the candidate AP cluster from another AP cluster connected to the VLAN, and wherein the cluster identifiers facilitates multiple AP clusters operating on the VLAN;
generating a new cluster identifier;
transmitting a cluster connection request, wherein the cluster connection request includes a request for joining the candidate AP cluster;
receiving a cluster connection response, wherein the cluster connection response is associated with the candidate AP cluster; and
establishing a new AP cluster based on the cluster connection response indicating that the request for joining the candidate AP cluster is rejected and the new cluster identifier.

21. An apparatus, comprising:
a processing resource coupled to a network transceiver, the processing resource to execute instructions to cause the network transceiver to:
establish a connection with a virtual local area network (VLAN);
receive a cluster identifier, wherein the cluster identifier is associated with a candidate access point cluster (AP cluster), wherein the cluster identifier distinguishes the candidate AP cluster from another AP cluster connected to the VLAN, and wherein the cluster identifiers facilitates multiple AP clusters operating on the VLAN;
transmit a cluster connection request, wherein the cluster connection request includes a request for joining the candidate AP cluster;
receive a cluster connection response, wherein the cluster connection response is associated with the candidate AP cluster;
generate a new cluster identifier; and
establish a new AP cluster based on the cluster connection response indicating that the request for joining the candidate AP cluster is rejected and the new cluster identifier.

* * * * *